United States Patent
Park et al.

(10) Patent No.: US 11,476,485 B1
(45) Date of Patent: Oct. 18, 2022

(54) POLYAROMATIC ELECTROLYTES FOR ALKALINE MEMBRANE FUEL CELLS

(71) Applicant: TRIAD NATIONAL SECURITY, LLC, Los Alamos, NM (US)

(72) Inventors: Eun Joo Park, Los Alamos, NM (US); Yu Seung Kim, Los Alamos, NM (US); Sandipkumar Maurya, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 458 days.

(21) Appl. No.: 16/428,803

(22) Filed: May 31, 2019

Related U.S. Application Data

(60) Provisional application No. 62/678,832, filed on May 31, 2018.

(51) Int. Cl.
*H01M 4/92* (2006.01)
*H01M 4/86* (2006.01)
(Continued)

(52) U.S. Cl.
CPC .......... *H01M 8/1023* (2013.01); *C08G 61/10* (2013.01); *H01M 4/925* (2013.01);
(Continued)

(58) Field of Classification Search
CPC ............... H01M 8/1023; H01M 4/925; H01M 2004/8684; H01M 2008/1095; H01M 2300/0082; C08G 61/10
(Continued)

(56) References Cited

U.S. PATENT DOCUMENTS

| | | | |
|---|---|---|---|
| 4,187,156 A * | 2/1980 | Coleman | C25B 3/25 |
| | | | 205/463 |
| 4,982,037 A * | 1/1991 | Nakamura | C07C 2/66 |
| | | | 585/446 |

(Continued)

FOREIGN PATENT DOCUMENTS

WO    WO 2016/081432 A1    5/2016

OTHER PUBLICATIONS

Park et al., How does a small structural change of anode ionomer make a big difference in alkaline membrane fuel cell performance?, Journal of Materials Chemistry A, Royal Society of Chemistry, 2019, 7, 25040-25046 (Year: 2019).*

(Continued)

*Primary Examiner* — Christian Roldan
(74) *Attorney, Agent, or Firm* — Lewis Roca Rothgerber Christie LLP

(57) ABSTRACT

A polyaromatic electrolyte for a fuel cell electrode includes a structure represented by Formula 1, wherein in Formula 1, Ar is a neutral unit represented by one of Formula 2A and Formula 2B:

Formula 1

Formula 2A (Continued)

-continued

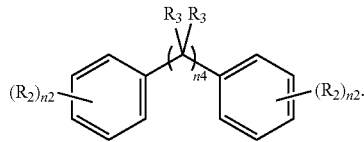

Formula 2B

The fuel cell electrode may include a catalyst suspended in the polyaromatic electrolyte.

2 Claims, 8 Drawing Sheets

(51) Int. Cl.
  *H01M 8/10* (2016.01)
  *H01M 8/1023* (2016.01)
  *C08G 61/10* (2006.01)
(52) U.S. Cl.
  CPC ............ *H01M 2004/8684* (2013.01); *H01M 2008/1095* (2013.01); *H01M 2300/0082* (2013.01)
(58) Field of Classification Search
  USPC ........................................................ 429/492
  See application file for complete search history.

(56) References Cited

U.S. PATENT DOCUMENTS

| | | | | |
|---|---|---|---|---|
| 6,933,068 | B2 * | 8/2005 | Asano | B01D 71/72 521/27 |
| 2006/0073369 | A1 * | 4/2006 | Fuller | H01M 8/1032 521/27 |
| 2017/0203289 | A1 * | 7/2017 | Bae | H01M 8/083 |
| 2017/0355811 | A1 * | 12/2017 | Bae | H01M 8/1072 |

OTHER PUBLICATIONS

Priddy et al., Alkylation of Biphenyl Under Mild Friedel-Craft Conditions, Benzene Research Laboratory, vol. 8, No. 3, Sep. 1969, p. 239-241. (Year: 1969).*
Priddy, Duane B., Alkylation of Biphenyl Under Mild Friedel-Craft Conditions, Benzene Research Laboratory, The Dow Chemical Co., 48640, vol. 8, No. 13, Sep. 1969, pp. 239-241. (Year: 1969).*
Easton, E. Bradley, et al., "Properties of Gas Diffusion Electrodes Containing Sulfonated Poly(ether ether ketone)," *Journal of The Electrochemical Society*, 2005, 152, A752-A758.
Harmon, Jennifer et al., "Determination of Molecular Self-Diffusion Coefficients Using Pulsed-Field-Gradient NMR: An Experiment for Undergraduate Physical Chemistry Laboratory", *Journal of Chemical Education*, 2012, 89 (6), 780-783.
Matanovic, I. et al., "Benzene Adsorption: A Significant Inhibitor for the Hydrogen Oxidation Reaction in Alkaline Conditions", *J. Phys Chem. Lett.* 2017, 8, p. 4918-4927.
Yim, S.D., et al., "A Microelectrode Study of Interfacial Reactions at the Platinum-Alkaline Polymer Interface", *Journal of The Electrochemical Society*, 2015, 162 (6), F499-F506.

* cited by examiner

POLYAROMATIC ELECTROLYTES FOR ALKALINE MEMBRANE FUEL CELLS

CROSS-REFERENCE TO RELATED APPLICATION

This application claims priority to and the benefit of U.S. Provisional Application No. 62/678,832, filed May 31, 2018 and titled "POLYAROMATIC ELECTROLYTES FOR ALKALINE MEMBRANE FUEL CELLS", the entire content of which is incorporated herein by reference.

STATEMENT REGARDING GOVERNMENT RIGHTS

The United States government has rights in this invention pursuant to Contract No. 89233218CNA000001 between the United States Department of Energy/National Nuclear Security Administration and Triad National Security, LLC for the operation of Los Alamos National Laboratory.

BACKGROUND

Fuel cells are electrochemical devices that convert chemical energy into electrical energy. Such devices typically operate by reacting a fuel (such as hydrogen gas or an organic compound) with an oxidant (such as oxygen gas) so that electrons produced by oxidation of the fuel can be routed through an external circuit to provide direct current (DC) electrical power before being transferred to the oxidant. Fuel cell electrodes often include catalysts that enable the operative reduction and oxidation (redox) reactions to occur at lower voltages (overpotentials) and with higher currents (rates).

Alkaline membrane fuel cells (fuel cells that are operated under alkaline conditions, AMFCs) are of interest for their compatibility with inexpensive and efficient metal catalysts for the oxygen reduction reaction (ORR). However, electrolyte adsorption to metal catalysts (e.g., formation of a catalyst-electrolyte coordination complexes) in the electrodes under alkaline conditions, in particular to platinum (Pt) in the anode of an AMFC, may inhibit turnover of those catalysts. In addition, low hydrogen and oxygen gas permeability of electrolytes may inhibit access of these reactants to the catalyst. When electrolyte adsorption to the catalyst and/or low access of reactants occur, the power density of the fuel cell may be limited.

SUMMARY

According to embodiments of the present disclosure, a polyaromatic electrolyte includes a structure represented by Formula 1, wherein in Formula 1, Ar is a neutral unit represented by Formula 2A or Formula 2B; the $-C(CF_3)(CH_2(CH_2)_nCH_2QA^+)$ moiety is a charged unit where $QA^+$ represents a quaternary ammonium group; n is an integer of 1 to 20; m is an integer of 10 to 500; each $R_1$, $R_2$, and $R_3$ is independently selected from a $C_1$ to $C_{10}$ alkyl group and a halogen group; each n1 and n2 is independently an integer of 0 to 4; and n4 is an integer of 1 to 20:

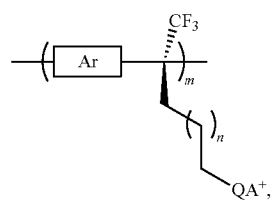

Formula 1

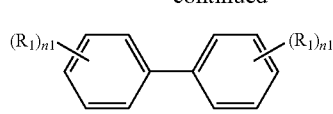

Formula 2A

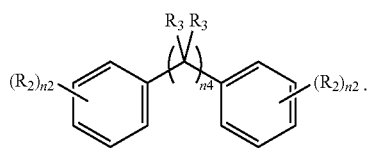

Formula 2B

In some embodiments, each $R_1$, $R_2$, and $R_3$ may be independently selected from a methyl group ($CH_3$), an ethyl group ($CH_2CH_3$), and fluorine (F).

In some embodiments, the neutral unit represented by Formula 2A or 2B may be represented by one of Formulae 3A-3F, wherein in Formulae 3A-3F, each $R_{11}$ and $R_{12}$ may be independently selected from a $C_1$ to $C_{10}$ alkyl group and a halogen group; and n4 may be an integer of 1 to 20:

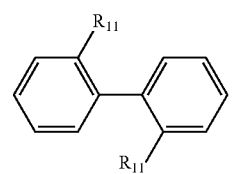

Formula 3A

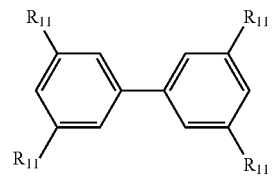

Formula 3B

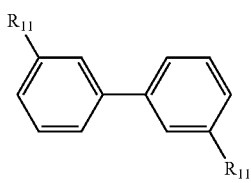

Formula 3C

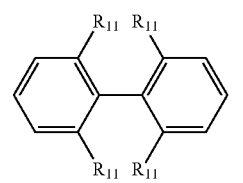

Formula 3D

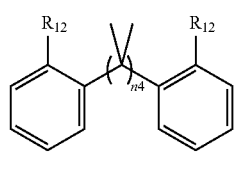

Formula 3E

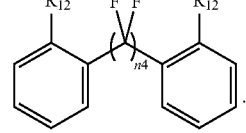

Formula 3F

In some embodiments, each $R_{11}$ and $R_{12}$ may be independently selected from a methyl group ($CH_3$), an ethyl group ($CH_2CH_3$), and fluorine (F).

In some embodiments, the neutral unit represented by Formula 2A or 2B may be represented by:

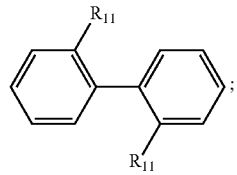

wherein $R_{11}$ is a methyl group.

In some embodiments, the quaternary ammonium group may be represented by one of Formulae 4A-4E, wherein in Formulae 4A-4E, each $R_{21}$ may independently be a $C_1$ to $C_{20}$ alkyl group; n22 may be an integer of 1 to 20; and * denotes a connection point to the $-C(CF_3)(CH_2(CH_2)_nCH_2QA^+)$ moiety:

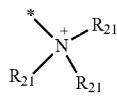

Formula 4A

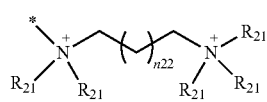

Formula 4B

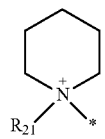

Formula 4C

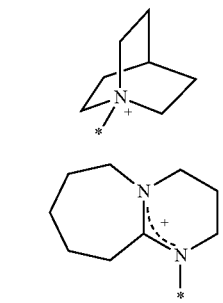

Formula 4D

Formula 4E

In some embodiments, each $R_{21}$ may be independently selected from a methyl group, an ethyl group, a propyl group, a butyl group, a pentyl group, a hexyl group, a heptyl group, an octyl group, a nonyl group, and a decyl group. In some embodiments, each $R_{21}$ may independently be a methyl group or an ethyl group.

In some embodiments, the polyaromatic electrolyte may have a structure represented by o-BTN, wherein m may be an integer of 10 to 500:

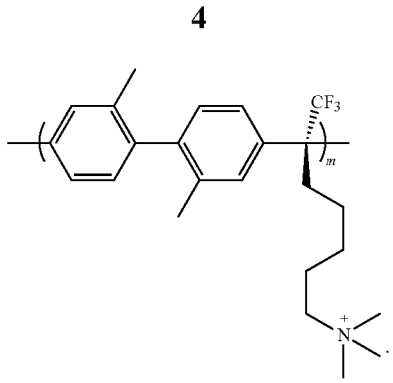

In some embodiments, the polyaromatic electrolyte may have a structure represented by TEA-o-BTN, wherein m may be an integer of 10 to 500:

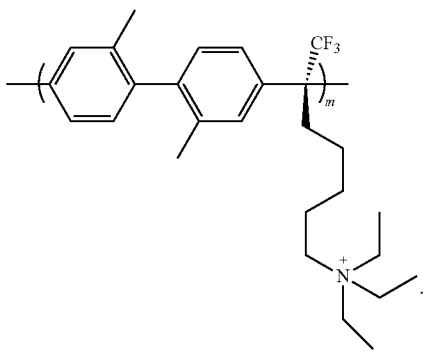

In some embodiments, the polyaromatic electrolyte may have a number average molecular mass ($M_n$) of about 6,330.

According to embodiments of the present disclosure, a polyaromatic electrolyte includes a copolymer of a neutral unit and a charged unit, wherein the neutral unit is represented by Formula 2A or Formula 2B; the charged unit is represented by $-C(CF_3)(CH_2(CH_2)_nCH_2QA^+)$, where $QA^+$ represents a quaternary ammonium group; n is an integer of 1 to 20; m is an integer of 10 to 500; each $R_1$, $R_2$, and $R_3$ is independently selected from a $C_1$ to $C_{10}$ alkyl group and a halogen group; each n1 and n2 is independently an integer of 0 to 4; and n4 is an integer of 1 to 20:

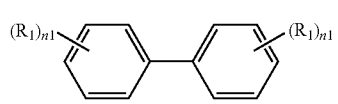

Formula 2A

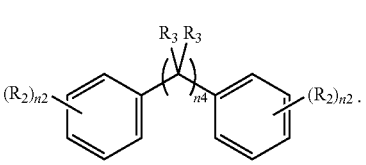

Formula 2B

In some embodiments, the copolymer may be an alternating copolymer.

In some embodiments, the quaternary ammonium group may be represented by one of Formulae 4A-4E, wherein in Formulae 4A-4E, each $R_{21}$ may independently be a $C_1$ to $C_{20}$ alkyl group; n22 may be an integer of 1 to 20; and * denotes a connection point to the $-C(CF_3)(CH_2(CH_2)_nCH_2QA^+)$ moiety:

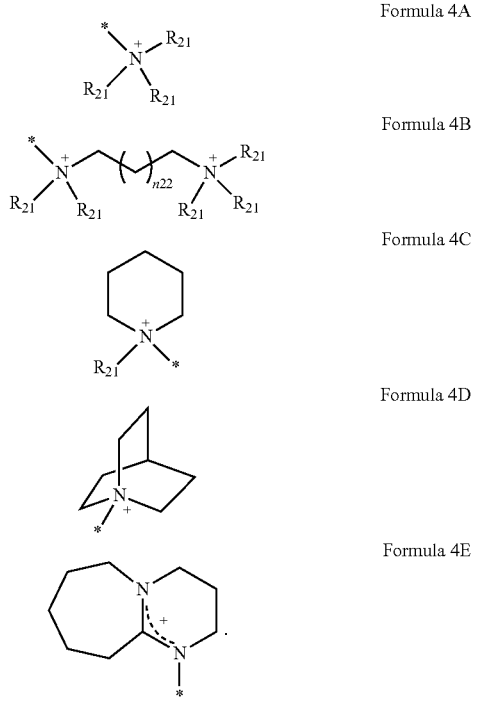

Formula 4A

Formula 4B

Formula 4C

Formula 4D

Formula 4E

In some embodiments, each $R_{21}$ may be independently selected from a methyl group, an ethyl group, a propyl group, a butyl group, a pentyl group, a hexyl group, a heptyl group, an octyl group, a nonyl group, and a decyl group.

According to embodiments of the present disclosure, a fuel cell anode includes the polyaromatic electrolyte as an anode ionomer; and a platinum group metal (PGM) catalyst suspended in the polyaromatic electrolyte.

According to embodiments of the present disclosure, a fuel cell includes: a cathode, an anode; and an anion exchange membrane between the cathode and the anode, where one or more of the cathode, the anode, and the anion exchange membrane include the polyaromatic electrolyte. In some embodiments, the anode includes the polyaromatic electrolyte and a catalyst for a hydrogen oxidation reaction (HOR). In some embodiments, the cathode includes the polyaromatic electrolyte and a catalyst for an oxygen reduction reaction (ORR).

BRIEF DESCRIPTION OF THE DRAWINGS

These and other features and advantages of embodiments of the present disclosure will be better understood by reference to the following detailed description when considered in conjunction with the accompanying drawings.

DETAILED DESCRIPTION

Figure 1:
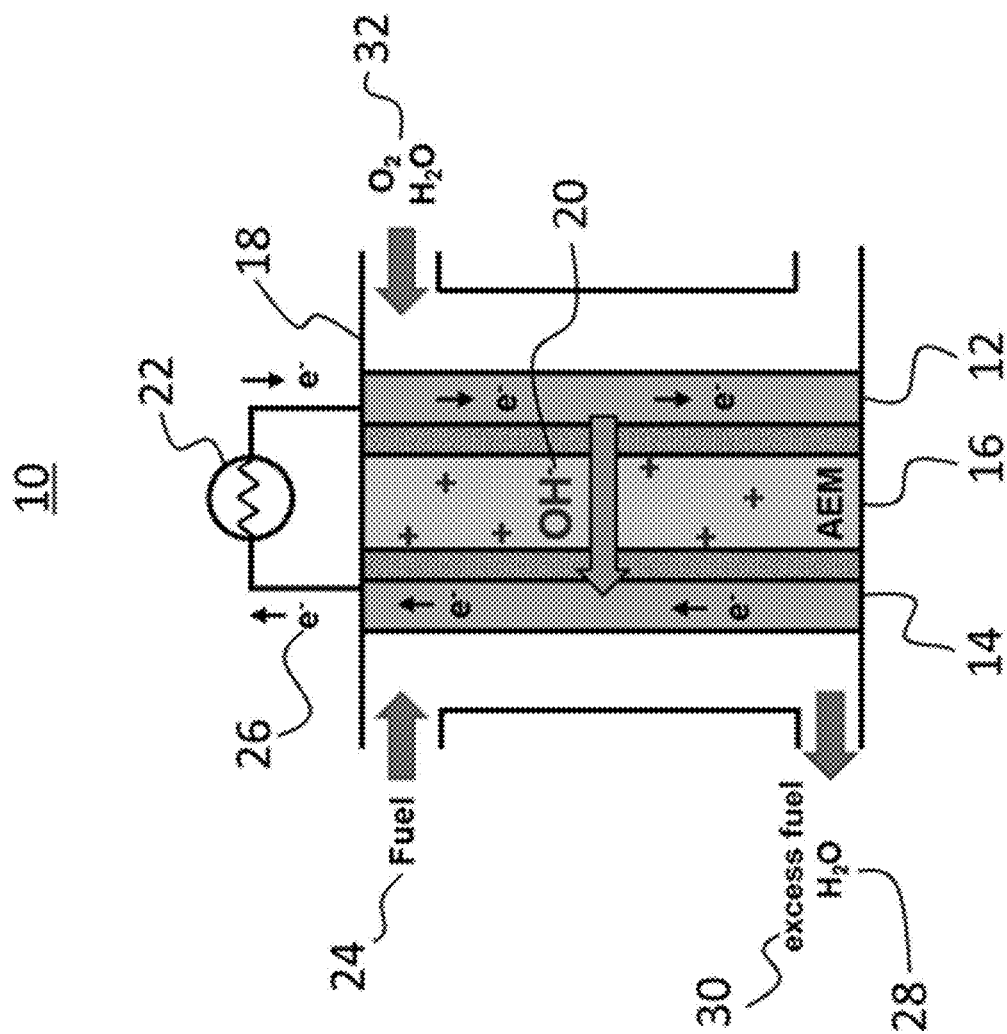
FIG. 1 is a schematic diagram of a fuel cell according to embodiments of the present disclosure.

A desire for carbon dioxide-neutral and highly efficient energy sources, reliable backup power generation, and portable energy sources for transportation and consumer electronics has driven the development of electrochemical devices, including fuel cells. Fuel cells convert chemical energy into electrical energy, and typically operate by reacting a fuel (such as hydrogen gas or an organic compound) with an oxidant (such as oxygen gas) so that electrons produced by oxidation of the fuel can be routed through an external circuit to provide direct current (DC) electrical power before being transferred to the oxidant. These electrochemical half-reactions typically occur at the electrodes (e.g., cathode and anode) of the fuel cell, and the electrodes often include catalysts that enable the operative reduction and oxidation (redox) reactions in the fuel cell to occur at lower voltages (overpotentials) and with higher currents (rates). Much of the developmental work on fuel cells has focused on the development of catalysts that are active towards the operative reactions that drive such devices.

Many operative fuel cell reactions involve proton and/or hydroxide-coupled electron transfer, and as such, the mechanism and reaction rates of these reactions are closely tied to the pH at which the fuel cell is run. Indeed, fuel cells are generally run under either highly acidic (pH 51) or highly alkaline (pH 13) conditions in order to promote either a proton-dependent or hydroxide-dependent mechanism, as well as to increase the rate of reaction according to standard rate law theory. The particular catalysts used at the fuel cell electrodes may determine the operating conditions. For example, catalysts derived from inexpensive earth-abundant elements including silver, carbon, cobalt, etc. have been shown to yield oxygen reduction reaction (ORR) activities rivaling that of catalysts derived from the platinum group metals (PGM) when used under alkaline conditions. As such, alkaline membrane fuel cells (AMFCs) including such inexpensive earth-abundant catalysts under alkaline conditions are a promising alternative to proton exchange membrane fuel cells (PEMFCs) using high loadings (e.g., 0.2 g kW$^{-1}$) of expensive PGM catalysts. The operative reactions in an AMFC using $H_2$ as a fuel are summarized in Table 1:

TABLE 1

| Anode (HOR) | Cathode (ORR) |
|---|---|
| Overall reaction $H_2 + 2OH^- \rightarrow 2H_2O + 2e^-$ | $1/2\ O_2 + H_2O + 2e^- \rightarrow 2OH^-$ |

The terms "alkaline anion exchange membrane fuel cell (AAEMFC)", hydroxide exchange membrane fuel cell (HEMFC)", "anion-exchange membrane fuel cell (AE-MFC)", "alkaline membrane fuel cell (AMFC)", and like terms are interchangeably used herein to refer to a fuel cell including a solid polymer electrolyte that is operated under alkaline conditions, for example, in the presence of hydroxide ions.

However, the use of AMFCs including inexpensive earth-abundant catalysts has been limited by low peak power densities (e.g., ca. <500 mW cm$^{-2}$ under saturated $H_2/O_2$ conditions). This limitation is believed to arise from slow kinetics for the hydrogen oxidation reaction (HOR) as catalyzed by a platinum (Pt)-based catalyst at the anode, and is observed only under alkaline conditions (e.g., it is not observed under acidic conditions). Without being bound by the correctness of any particular explanation or theory, electrochemical and density functional theory (DFT) studies suggest that the inhibition of HOR at the anode is due to adsorption of benzene and other aromatic moieties in the polymer electrolyte to the surface of the anode, and particularly to the Pt catalyst. These studies are described in detail in Matanovic, I. et al., "Benzene Adsorption: A Significant Inhibitor for the Hydrogen Oxidation Reaction in Alkaline Conditions", *J. Phys Chem. Lett.* 2017, 8, pg. 4918-4927, the entire content of which is incorporated herein by reference. In particular, formation of a metal-pi interaction between a Pt atom and a benzene moiety (phenyl group) is energetically favorable. The benzene moiety thus acts as a competitive inhibitor with respect to $H_2$. The degree of phenyl absorption may be decreased in bimetallic Pt—Ru catalysts, relative to Pt-only catalysts, because the addition of Ru shifts the energy level of the d-band toward negative values with respect to the Fermi level, thereby decreasing the energetic favorability of the metal-pi interaction. However, other issues remain.

Another limitation, for example, is believed to arise from low or reduced gas permeability of polyaromatic electrolytes, which may decrease access of gaseous reactants (including $H_2$ gas and $O_2$ gas) to catalysts at the anode and cathode of the AMFC. Electrochemical studies suggest that the low efficiencies of these electrodes are due to the low reactant ($H_2$) gas permeation of polyaromatic electrolytes, as described in detail in Easton et al., "Properties of Gas Diffusion Electrodes Containing Sulfonated Poly(ether ether ketone)," *J. Electrochem. Soc.* 2005, 152, A752-A758, the entire content of which is incorporated herein by reference. For example, electrodes including hydrophilic catalysts such as Pt-based catalysts, palladium (Pd), and ruthenium (Ru) exhibit low efficiencies under water-generating reaction conditions (e.g., at the anode in AMFCs, and at the cathode in acidic proton exchange membrane fuel cells), due in part to co-adsorption of the generated water on the catalyst. AMFC cathodes including N-doped carbon also exhibit low efficiencies.

According to embodiments of the present disclosure, a polyaromatic electrolyte for use in an electrochemical device exhibits reduced adsorption to a metal catalyst and increased $H_2$ permeability. The polyaromatic electrolyte according to embodiments of the present disclosure may be used in various electrical and electrochemical applications using a solid polymer electrolyte, including batteries, supercapacitors, electrolyzers, fuel cells, etc. In some embodiments, the electrochemical device may be a fuel cell device. The type or chemistry of the fuel cell device is not particularly limited. In some embodiments, for example, the fuel cell device may be an alkaline membrane fuel cell (AMFC).

Additionally, the polyaromatic electrolyte according to embodiments of the present disclosure may be used in any suitable component of the electrochemical device (e.g., a fuel cell device). For example, in some embodiments, the polyaromatic electrolyte may be used in the electrode(s) (e.g., the cathode and/or the anode), and/or in the electrolyte (or electrolyte membrane). In embodiments in which the polyaromatic electrolyte is included as a component of the electrode(s), the electrode(s) may further include a catalyst (or electrocatalyst), as discussed herein. In some embodiments, for example, the polyaromatic electrolyte may be included in at least the anode of an electrochemical device (e.g., a fuel cell, such as an alkaline membrane fuel cell).

As discussed above, the polyaromatic electrolyte according to embodiments of the present disclosure may be used in the cathode, anode, or electrolyte in any number of different electrochemical devices. For example, in some embodiments, the polyaromatic electrolyte may serve as the electrolyte (or electrolyte membrane) to promote electron transport between two electrodes (e.g., the anode and cathode) of an electrode assembly or a membrane electrode assembly of the electrochemical device. In some embodiments, the polyaromatic electrolyte may alternatively (or additionally) be used as a component of the electrodes (i.e., either or both of the anode and/or cathode). Whether employing the polyaromatic electrolytes described herein or not, the electrodes of the electrode assembly or membrane electrode assembly may also include any of various suitable catalysts, and the polyaromatic electrolyte (when present in the electrode(s)) may thus be incorporated in the electrode(s) together with the catalysts. The catalysts may be active for one or more redox (electrochemical reduction and/or oxidation) reactions. The type or kind of redox reaction is not particularly limited, but may depend on the type, kind, or purpose of the device, the chemicals (e.g., fuels and/or electron carriers) present in the device environment, the electrocatalytic activity of the electrodes or the catalysts included in the electrodes, etc. In some embodiments, when the device is a fuel cell device, the operative redox reactions may include one or more of the oxygen reduction reaction (ORR), the oxygen evolution reaction (OER), the hydrogen evolution reaction (HER), the hydrogen oxidation reaction (HOR), etc. As used herein, the term "ORR" (and like terms) is used in its art-recognized sense to refer to a reaction in which oxygen is reduced to water or hydroxide; the term "OER" (and like terms) is used in its art-recognized sense to refer to a reaction in which water or hydroxide is oxidized to yield (evolve) oxygen; the term "HER" (and like terms) is used in its art-recognized sense to refer to a reaction in which protons or water are reduced to yield (evolve) $H_2$; and the term "HOR" (and like terms) is used in its art-recognized sense to refer to a reaction in which hydrogen is oxidized to yield protons or water. The particular operative mechanism(s) of the operative redox reaction(s) are not limited to any particular stated reaction or mechanism, and may vary according to a number of factors such as pH, concentration, catalyst involvement, etc. that are known to those having ordinary skill in the art. In some embodiments, the operative redox reaction may be the HOR. In some embodiments, the HOR may take place at the anode of the fuel cell.

In some embodiments, as discussed generally above, an electrode (e.g., in an electrode assembly or membrane electrode assembly) may include a catalyst (electrocatalyst). The term "catalyst" (and like terms) is used herein in its art-recognized sense to refer to a material that increases the rate of a chemical reaction, e.g., by decreasing the activation energy required for reaction, without itself being permanently changed or used up, and the term "electrocatalyst" (and like terms) is used herein in its art-recognized sense to further refer to a material that increases the rate of an electrochemical reaction including one or more electron transfer steps. Further, with respect to an electrochemical reaction, the catalyst (or electrocatalyst) may decrease the potential required to initiate the reaction, or in other words, decrease the overpotential for the reaction. The term "overpotential" is used herein in its art-recognized sense to refer to the voltage (energy) difference between that required for onset of the reaction and the voltage corresponding to the standard reduction potential. As such, the catalyst may enable the electrode to achieve a higher current density at a lower overpotential.

The type or kind of catalyst is not particularly limited as long as it is sufficiently active for the particular electrochemical application. The activity of the catalyst can be assessed in terms of the rate of the catalyst (observed as limiting current density at the electrode), the efficiency of the catalyst (observed as the overpotential, voltage onset, and/or half-wave voltage), the selectivity of the catalyst for a desired reaction or product, and the stability and lifetime of the catalyst (observed as stability of the current over operation time). Those having ordinary skill in the art are capable of identifying suitable catalysts for a particular application. In some embodiments, the catalyst may be a heterogeneous catalyst including a PGM (platinum group metal). In some embodiments, the catalyst may be a heterogeneous catalyst not including a PGM (e.g., a heterogeneous catalyst including a non-PGM based catalyst material. In some embodiments, the non-PGM catalyst may be a heterogeneous catalyst including carbon. Non-limiting examples of the catalyst may include Pt, rhodium (Rh), Ru, Pd, iridium (Ir), gold (Au), nickel (Ni), N-doped carbon or a mixture or alloy thereof.

In some embodiments, as discussed above, the electrode(s) of the electrochemical device (e.g., the cathode and/or the anode) may include the polyaromatic electrolyte in addition to the catalyst (or electrocatalyst). The catalyst (or electrocatalyst) in the electrode may be held in place by the polyaromatic electrolyte. That is, the catalyst may be suspended in the polyaromatic electrolyte without being inhibited by the polyaromatic electrolyte.

According to embodiments of the present disclosure, the polyaromatic electrolyte may be an ionomer. The term "ionomer" is used herein in its art-recognized sense to refer to a polymer including a combination of electrically neutral repeating units ("neutral units (NU)" or "NU monomers") with a smaller fraction of charged (ionized) repeating units ("charged units (CU)" or "CU monomers"). For example, the ionomer may be considered a copolymer of charged units and neutral units. The neutral units may include any suitable neutral unit, for example, a neutral unit including one or more aromatic groups.

The charged units may incorporate pendant groups on the polymer backbone, and may include charge-bearing moieties. In some embodiments, the charge-bearing moieties may be located near or at the end of a hydrocarbon or fluorocarbon chain of the pendant group. The charge-bearing moieties may be counterbalanced by mobile charge carriers. In some embodiments, the charge-bearing moiety of the charged unit(s) may include a cation (e.g., a positively charged group), and for example, the cationic charge-bearing moiety may be counterbalanced by mobile hydroxide groups. In some embodiments, the charge-bearing moiety of the charged unit(s) may include a quaternary ammonium group.

In some embodiments, for example, the polyaromatic electrolyte may include a neutral unit (e.g., one or more neutral units) including one or more aromatic groups (which may be the same or different from each other), and a charged unit (e.g., one or more charged units) including one or more quaternary ammonium groups (which may be the same or different from each other). In some embodiments, the polyaromatic electrolyte may be an alternating copolymer (bipolymer) -A-B-A-B-A-B- of neutral units A and charged units B.

In some embodiments, however, when the polymer electrolyte has or requires a lower ionic content (for example, an ion exchange capacity of less than about 1.0 meq $g^{-1}$, the charged unit may be replaced with a non-charged unit having a chemical or chain structure similar to that of the charged unit but without the charge, as described in more detail below. It is thus understood that reference to the "charged unit" in some embodiments refers to a "non-charged unit", and those of ordinary skill in the art will understand from the context of the description whether the charged unit is charged or non-charged (for example, those of ordinary skill in the art will understand whether the "charged unit" is charged or non-charged when considering the discussion of the electrostatic properties of the charged unit).

In some embodiments, for example, the polyaromatic electrolyte may include a neutral unit-charged unit (NU-CU) structure represented by Formula 1:

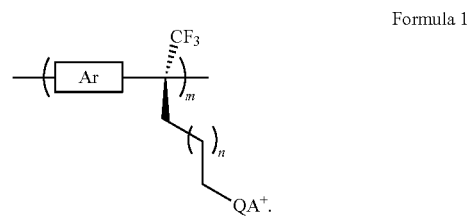

Formula 1

Here, the term "NU-CU structure" indicates that one neutral unit monomer and one charged unit monomer together form an "implicit monomer" that is the basic repeating unit in the polyaromatic electrolyte. In Formula 1, Ar represents a neutral unit including one or more aromatic groups, and the —C(CF$_3$)(CH$_2$(CH$_2$)$_n$CH$_2$QA$^+$) moiety represents the charged unit including a quaternary ammonium group (QA$^+$) as the charge-bearing moiety. The charge on QA$^+$ may be counterbalanced by any suitable anion, as described herein. In Formula 1, n may be an integer of 1 to 20, and m may be an integer of 10 to 500. For example, n may be an integer of 1 to 15, 1 to 10, 1 to 8, or 2 to 6, and m may be an integer of 50 to 100. Additionally, the —C(CF$_3$)(CH$_2$(CH$_2$)$_n$CH$_2$QA$^+$) moiety depicted in Formula 1 may alternatively be expressed as C(CF$_3$)((CH$_2$)$_p$QA$^+$) in which n is an integer of at least 2. When expressed in this manner, p may be an integer of at least 3, for example 3 to 22, 3 to 17, 3 to 12, 3 to 10, or 3 to 8.

In Formula 1, in some embodiments, the neutral unit represented by Ar may include a substituted biphenyl group. In some embodiments, the neutral unit represented by Ar may include two substituted phenyl groups bridged with an alkyl (i.e., an alkylene) or fluoroalkyl (i.e., a fluoroalkylene) chain. In some embodiments, the neutral unit represented by Ar may have a structure represented by one of Formula 2A and Formula 2B:

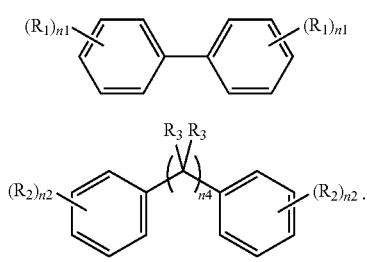

Formula 2A

Formula 2B

In Formulae 2A-2B, each $R_1$, $R_2$, and $R_3$ may be independently selected from a $C_1$ to $C_{10}$ alkyl group and a halogen group; each n1 and n2 may independently be an integer of 1 to 4 (such that the Ar neutral unit is a divalent aryl (i.e., arylene) moiety); and n4 may be an integer of 1 to 20. The neutral unit may be bonded (linked) on one ring (e.g., the right-side ring) to the charged unit within the NU-CU structure via any remaining position on that ring that is not substituted with an $R_1$ or $R_2$. Further, the neutral unit may be bonded (linked) on the other ring (e.g., the left-side ring) to the charged unit within an adjacent NU-CU structure via any remaining position on that ring that is not substituted with an $R_1$ or $R_2$. In some embodiments, each $R_1$, $R_2$, and $R_3$ may be independently selected from a methyl group (CH$_3$), an ethyl group (CH$_2$CH$_3$), and fluorine (F). In some embodiments, for example, each $R_1$, $R_2$, and $R_3$ may be independently selected from a methyl group and fluorine. In some embodiments, each n1 and n2 may independently be an integer of 1 to 2. In some embodiments, n4 may be an integer of 1 to 15, 1 to 10, 1 to 8, or 2 to 6.

In some embodiments, the neutral unit represented by Ar may have a structure represented by one of Formulae 3A-3F:

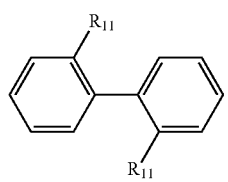

Formula 3A

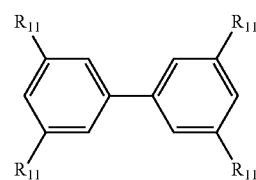

Formula 3B

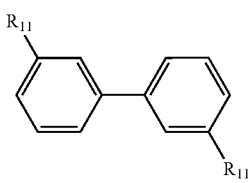

Formula 3C

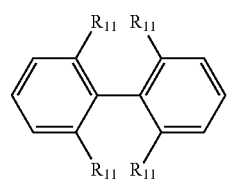

Formula 3D

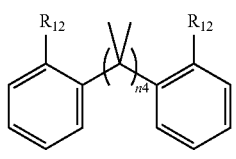

Formula 3E

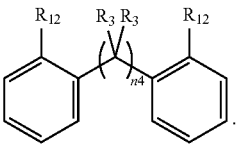

Formula 3F

In Formulae 3A-3F, each $R_{11}$ and $R_{12}$ may be independently selected from a $C_1$ to $C_{10}$ alkyl group and a halogen group, and n4 may be the same as described in connection with Formulae 2A-2B. The neutral unit may be bonded (linked) to the charged unit within the same NU-CU structure, and the charged unit in an adjacent NU-CU structure, in the same manner as discussed herein in connection with Formulae 2A-2B. In some embodiments, each $R_{11}$ and $R_{12}$ may be independently selected from a methyl group, an ethyl group, and fluorine. In some embodiments, for example, $R_{11}$ and $R_{12}$ may each be independently selected from a methyl group and fluorine. While Formulae 3A-3F depict multiple $R_{11}$s or $R_{12}$s, it is understood that each $R_{11}$ or $R_{12}$ on the same moiety may be the same or different from each other $R_{11}$ or $R_{12}$ on the same moiety. By way of illustration, for example, while Formulae 3A-3D show 2 or 4 $R_{11}$s, it is understood that each of the two $R_{11}$s on the Formula 3A moiety may be the same or different from each other, and each of the four $R_{11}$s on the Formula 3B moiety may be the same or different from each other, etc.

In some embodiments, for example, the neutral unit represented by Ar may be one of the following neutral units:

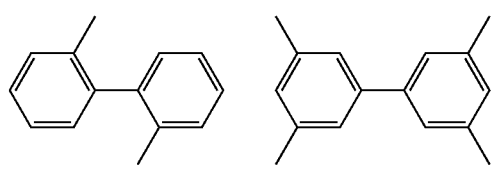

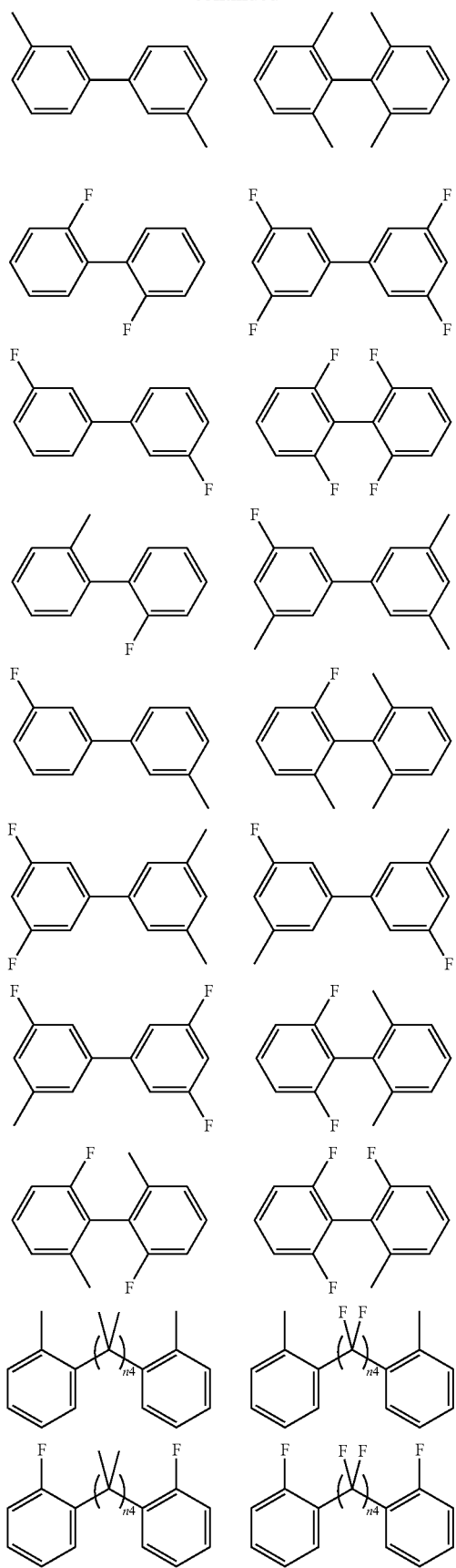

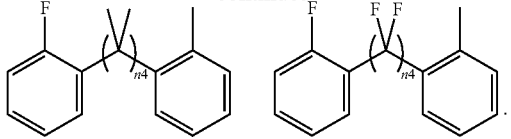

In Formula 1, in the charged unit, $QA^+$ may be a cationic quaternary ammonium group represented by one of Formulae 4A-4E:

Formula 4A
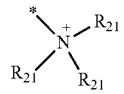

Formula 4B
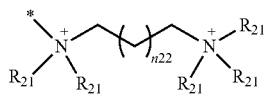

Formula 4C
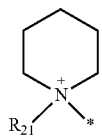

Formula 4D
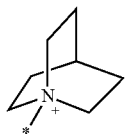

Formula 4E
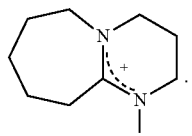

In Formulae 4A-4E, each $R_{21}$ may be independently selected from a $C_1$ to $C_{20}$ alkyl group, n22 may be an integer of 1 to 20, and * denotes a connection point to the —C(CF$_3$) (CH$_2$(CH$_2$)$_n$CH$_2$QA$^+$) moiety, where * replaces QA$^+$. The $C_1$ to $C_{20}$ alkyl group may be a linear, branched, or cyclic alkyl group, and in some embodiments, may be a linear alkyl group. In some embodiments, two or three adjacent $R_{21}$ groups may link together to form a monocyclic or bicyclic ring (such as a fused bicyclic ring or a bridged bicyclic ring). The fused rings may be carbocyclic or heterocyclic. In some embodiments, $R_{21}$ may be a lower alkyl group (e.g., a $C_1$ to $C_8$ alkyl group, or a $C_1$ to $C_5$ alkyl group). In some embodiments, each $R_{21}$ may be independently selected from a methyl group, an ethyl group, a propyl group, a butyl group, a pentyl group, a hexyl group, a heptyl group, an octyl group, a nonyl group, and a decyl group. In some embodiments, for example, $R_{21}$ may be a methyl group or an ethyl group. In some embodiments, n22 may be an integer of 1 to 15, 1 to 10, 1 to 8, 1 to 5, or 2 to 4. While Formulae 4A-4E depict multiple $R_{21}$s, it is understood that each $R_{21}$ on the same moiety may be the same or different from each other $R_{21}$ on the same moiety. By way of illustration, for example, while Formulae 4A-4B show 3 or 5 $R_{21}$s, it is understood that each of the three $R_{21}$s on the Formula 4A moiety may be the same or different from each other, and each of the five $R_{21}$s on the Formula 4B moiety may be the same or different from each other, etc.

In some embodiments, the polyaromatic electrolyte may have a NU-CU structure including a neutral unit represented by Formula 2A, for example, Formula 3A; and a charged unit in which QA+ is represented by Formula 4A, wherein $R_{21}$ is a lower alkyl group. In some embodiments, the polyaromatic electrolyte may have a NU-CU structure represented by one of o-BTN and TEA-o-BTN:

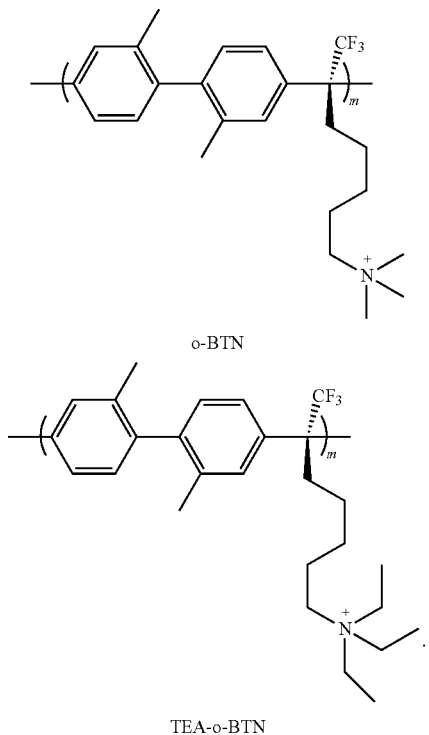

In o-BTN, the neutral unit is an ortho,ortho'-bitolyl moiety, and the charged unit is a —C(CF$_3$)(CH$_2$(CH$_2$)$_3$CH$_2$N+(CH$_3$)$_3$ group. In TEA-o-BTN, the neutral unit is an ortho,ortho'-bitolyl moiety, and the charged unit is a —C(CF$_3$)(CH$_2$(CH$_2$)$_3$CH$_2$N+(CH$_2$CH$_3$)$_3$ group. In BTN and TEA-o-BTN, m may be the same as described herein in connection with Formula 1.

The counter-anion to the QA+ group in Formula 1 (and Formulae 4A-4B) is not particularly limited, and may be subject to exchange. In some embodiments, for example, the counter-anion may be a halide such as iodide, bromide, or chloride. In some embodiments, the counter-anion may be a charge carrier species such as, for example, hydroxide.

In some embodiments, when one or more of the charged units in the polymer structure is replaced with a non-charged unit, the non-charged unit may have a structure similar to that described above for the charged unit, with the exception that the structure is charge-neutral. For example, the nitrogen atoms bearing a negative charge in Formula 4A-4E, o-BTN, and TEA-o-BTN may be omitted (such that the group is truncated), or replaced with a neutrally charged group (such as a tertiary amine NR$_3$, a halogen atom such as F, Cl, or Br, or a carbon atom) to form a neutral analogue.

The neutral unit(s) and the charged unit(s) (including any non-charged units) may be polymerized (e.g., coupled together) via a Friedel-Crafts polycondensation reaction. As understood in the art, Friedel-Crafts polycondensation and other Friedel-Crafts reactions (including alkylation and acylation) are electrophilic aromatic substitution (EAS) reactions involving the coupling of an aromatic ring (nucleophile) to an acyl carbonyl (electrophile). In Friedel-Crafts polycondensation, the strongly acidic conditions result in formation of a tertiary carbocation at the former carbonyl carbon, which acts as a second electrophile in a subsequent EAS reaction, resulting in chain formation. However, the polymerization mechanism is not limited to any polymerization-forming reaction, and any suitable polymerization reaction or process may be used.

The polyaromatic electrolyte may include multiple repeats of the NU-CU structure, as denoted by "m" in formula structures of the electrolyte. The number of repeats, and the size of the polyaromatic electrolyte is not particularly limited, and may be selected according to the desired electrode characteristics. In some embodiments, the polyaromatic electrolyte may have a number average molecular mass ($M_n$) of about 3,000 to about 100,000, for example, about 4,000 to about 50,000, about 5,000 to about 10,000, or about 6,330. For example, the variable m in Formula 1, o-BTN, TEA-o-BTN, and similar or related structures may be consistent with the number average molecular mass.

The ion exchange capacity (IEC) of the polyaromatic electrolyte may arise from the charged units. In some embodiments, the IEC of the polyaromatic electrolyte may be about 1.0 meq g$^{-1}$ to about 3.0 meq g$^{-1}$, for example, about 2.0 meq g$^{-1}$ to about 3.0 meq g$^{-1}$, or about 2.4 meq g$^{-1}$ to about 2.8 meq g$^{-1}$.

The substituted structure of the polyaromatic electrolyte as described herein may enable enhancement of the polyaromatic electrolyte's IEC, solubility, porosity, and stability, while also preventing or reducing adsorption of the polyaromatic electrolyte to the catalyst. In particular, the neutral unit including two substituted phenyl rings may help to reduce adsorption of the ionomer to the surface of the metal catalyst, compared to an unsubstituted neutral unit. Without being bound by the correctness of any particular explanation or theory, it is thought that the reduced adsorption may be due to steric interactions (e.g., between the substituents and the catalyst surface), electronic effects (e.g., resulting in reduced pi electron density for metal-pi bonding), or a combination thereof. Similarly, the use of bulky substituent groups on the quaternary ammonium in the charged unit may decrease adsorption of a quaternary ammonium cation-hydroxide-water layer to the catalyst, due to increased steric hindrance between the charge-bearing nitrogen atom and the catalyst surface.

The symmetric substitution in the neutral unit according to some embodiments of the present disclosure may also increase the hydrogen permeability of the polyaromatic electrolyte. Without being bound by the correctness of any particular explanation or theory, including classic gas separation membrane theory, it is thought that particular positions and/or combinations of substitution may restrict or reduce internal rotation of the aromatic rings around their crosslinking bonds, thereby increasing the fractional free volume (FFV) of the material and effectively increasing its gas (hydrogen) permeability. For example, substitution of a biphenyl-based unit at paired 2,2' or ortho,ortho'-positions may cause those substituent groups to clash when the dihedral angle between the two rings approaches 0°, and the energy of the steric interaction may effectively preclude a range of rotational conformations. Similar steric effects may be observed for substituents in other positions or in different neutral units, for example, between the CF$_3$ group in the charged unit and an ortho-substituent on an adjacent aromatic ring in the neutral unit, between $R_{12}$ and the substituents on the methylene bridge in the neutral units of Formulae 3E-3F, etc.

Furthermore, the particular substituent groups on the phenyl rings, ammonium groups, and bridges connecting adjacent phenyl rings or ammonium groups may be selected so that the ionomer is favorably hydrophobic, but does not become insoluble in organic solvents and is able to maintain a high IEC (such as, for example, the IECs discussed above). For example, because IEC is expressed in meq $g^1$ (milliequivalents conducted per gram of ionomer), the IEC is maximized or increased when the molecular weight of the neutral unit (non-conducting portion) of the ionomer is not excessively increased. In addition, the particular substituents may maximize or increase the free volume of the ionomer, resulting in larger pores and therefore higher gas diffusion permeability. Moreover, the substituents and chain lengths described herein may be selected for their stability in alkaline conditions.

According to embodiments of the present disclosure, a fuel cell includes a cathode (fuel cell cathode), an anode (fuel cell anode), and an anion exchange membrane (AEM) between the cathode and the anode, and one or more of the cathode, the anode, and the anion exchange membrane includes the polyaromatic electrolyte according to embodiments described herein. FIG. 1 is a schematic diagram of a fuel cell 10 according to embodiments of the present disclosure. The cathode 12, the anode 14, and the anion exchange membrane 16 are sandwiched together in a housing 18 and impregnated with a hydroxide-containing electrolyte 20. The fuel cell 10 is attached to an external load 22, forming a circuit. A fuel 24 is supplied to the anode, for example, in a flow configuration, and electrons 26 and water 28 are generated by oxidation of the fuel 24. The water 28 and excess fuel 30 are removed by the flow configuration, and the electrons 26 are transferred to the external load 22 and then to the cathode 12, where they react with cathode reactants 32 (including $O_2$ and $H_2O$) to thereby produce hydroxide 20 and complete the overall electrochemical reaction. One or more of the cathode 12, the anode 14, and the anion exchange membrane 16 include the polyaromatic electrolyte according to embodiments described herein.

In some embodiments, the anode may include the polyaromatic electrolyte and a catalyst for a hydrogen oxidation reaction (HOR). For example, the anode may be formed by suspending or mixing the HOR catalyst in the polymeric electrolyte according to embodiments of the present disclosure. The catalyst in the anode may be any suitable catalyst for the HOR. Non-limiting examples of the catalyst in the anode may include Pt/C (platinum on carbon) and other metal catalysts deposited on carbon, including Pt—Ru/C (a mixture of platinum and ruthenium), Pt—Mo/C (a mixture of platinum and molybdenum), Pt—Ni/C (a mixture of platinum and nickel), and mixtures thereof, as well as those described above.

In some embodiments, the cathode may include the polyaromatic electrolyte and a catalyst for an oxygen reduction reaction (ORR). For example, the cathode may be formed by suspending or mixing the ORR catalyst in the polyaromatic electrolyte according to embodiments of the present disclosure. The catalyst in the cathode may be any suitable catalyst for the ORR. Non-limiting examples of the catalyst in the cathode may include Pt/C (platinum on carbon) and other metal catalysts deposited on carbon, including Pt—Ru/C (a mixture of platinum and ruthenium), Pt—Mo/C (a mixture of platinum and molybdenum), Pt—Ni/C (a mixture of platinum and nickel), Pt—Co/C (a mixture of platinum and cobalt), iron-containing complexes on carbon, N-doped carbon, and mixtures thereof, as well those described above.

The following examples and experimental data are provided for illustrative purposes only, and do not limit the scope of the embodiments of the present disclosure.

Synthesis of o-BTN Ionomer

An ortho,ortho'-dimethyl-substituted biphenyl ionomer bearing trimethyl-substituted quaternary ammonium groups (o-BTN) was synthesized according to the series of steps described in Scheme 1:

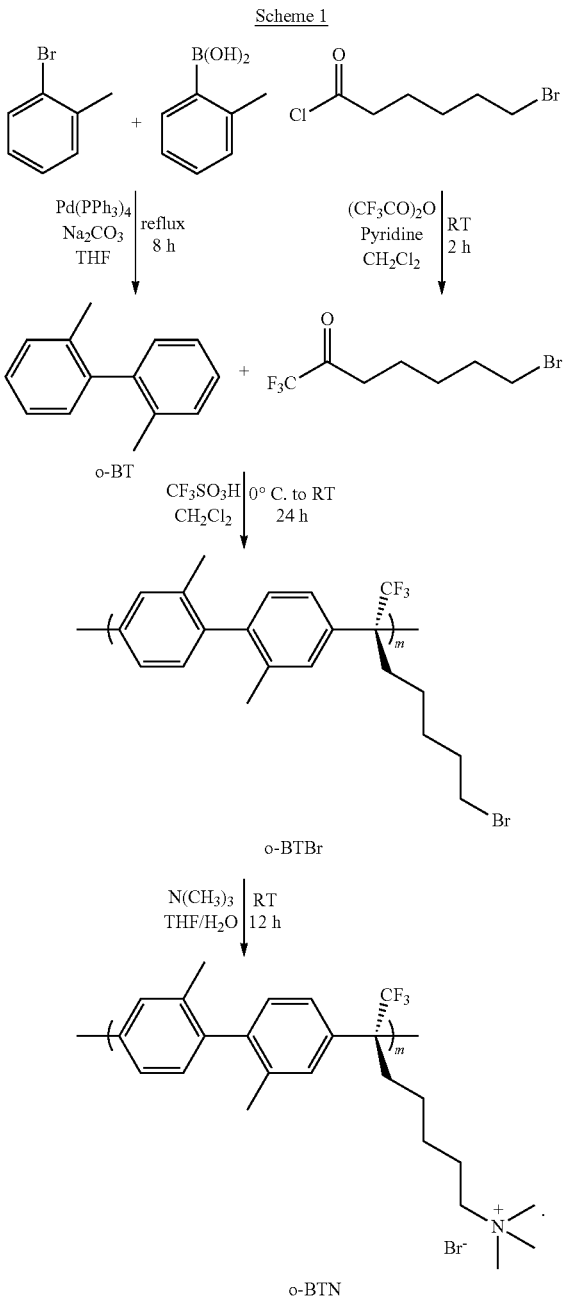

Scheme 1

Synthesis of o-BT. 1-Bromo-2-methylbenzene (5.1 g, 30 mmol) was coupled with 2-methylphenylboronic acid (4.9 g, 36 mmol, 1.2 eq.) in the presence of a $Pd(PPh_3)_4$ catalyst (1.7 g, 1.5 mmol, 5 mol %) by refluxing in THF (100 mL)

and an aqueous potassium carbonate solution (2 M, 60 mmol, 2.0 eq.) for 24 hours. The reaction was cooled to room temperature and extracted with ethyl acetate and water. The organic layer was dried over MgSO$_4$ and purified via column chromatography in hexane to yield ortho, ortho'-bitoluene (i.e., 2,2'-dimethyl biphenyl) as a colorless oil.

Meanwhile, 6-bromohexanoyl chloride was reacted with trifluoroacetic acid anhydride in a mixture of pyridine and CH$_2$Cl$_2$ to produce 7-bromo-1,1,1-trifluoro-2-heptanone.

Synthesis of o-BTBr ionomer. A mixture of o-BT (0.50 g, 2.75 mmol) and 7-bromo-1,1,1-trifluoro-2-heptanone (0.81 g, 3.29 mmol, 1.2 eq.) were reacted in the presence of trifluoromethanesulfonic acid (HOTf) (3 mL) in CH$_2$Cl$_2$ at a temperature of 0° C. and stirred at room temperature (25° C.) for 12 hours under nitrogen. The resulting dark brown mass was poured into methanol to form a precipitate, which was filtered and washed with warm methanol. The white solid was dried under vacuum to yield a dimethyl biphenyl polymer bearing 5-bromopentyl groups (o-BTBr).

Synthesis of o-BTN ionomer. An aqueous solution of trimethylamine (TMA, 1.0 mL) was added to a solution of o-BTBr (1.2 g) in THF (2.4 mL) and stirred at room temperature. The ionic polymer was formed as a precipitate after 24 hours, and deionized water was added to the reaction mixture to dissolve the precipitate. Further aliquots of TMA and water were added in succession to produce and dissolve additional portions of the ionic polymer. After the reaction was complete, the volatiles were evaporated, and the ionic polymer was precipitated from the remaining aqueous solution using ether. The precipitate was filtered and dried under vacuum to yield a dimethyl biphenyl polymer bearing 5-(trimethylammonium) pentyl bromide groups (o-BTN).

Figure 2:
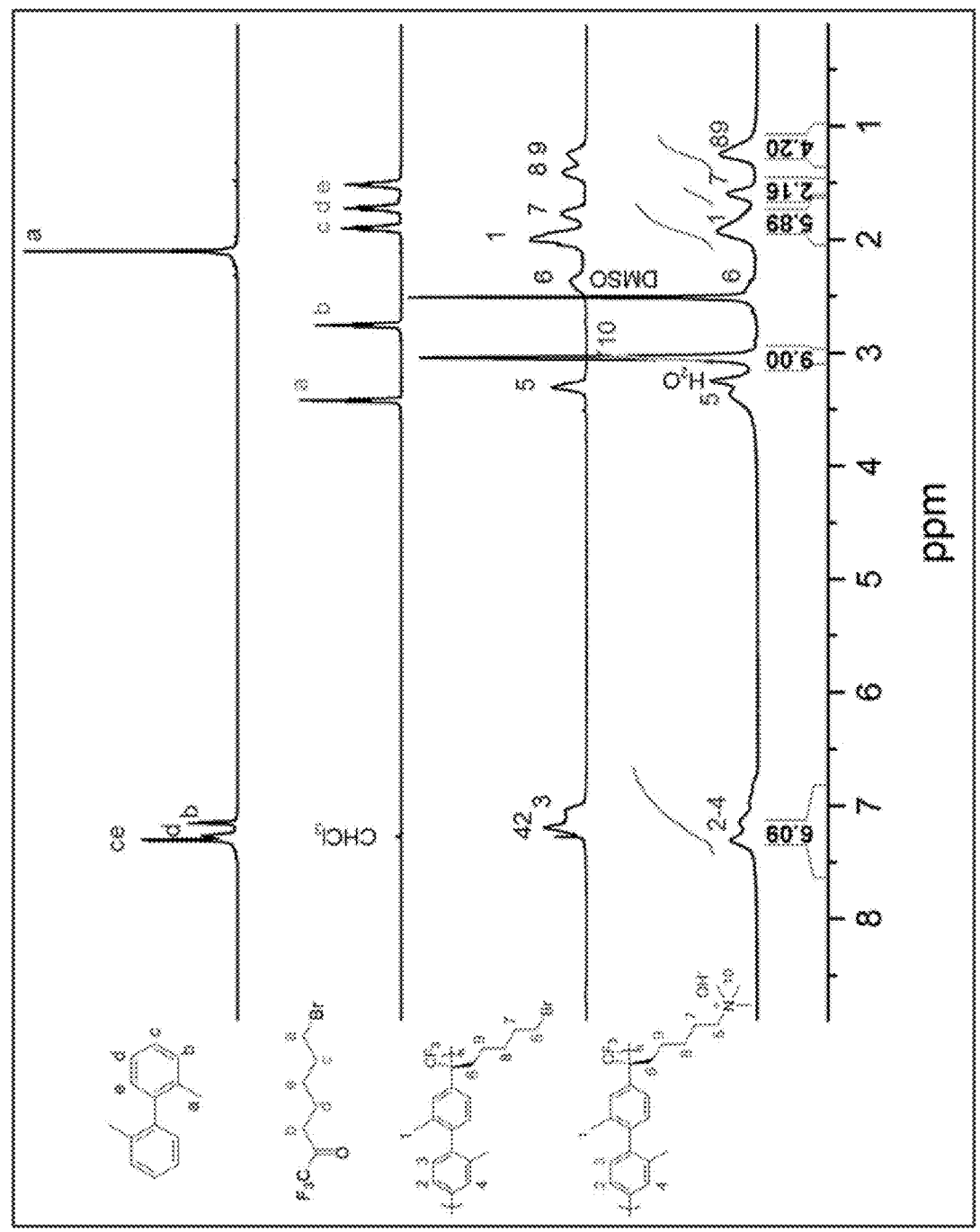
FIG. 2 shows the $^1H$ NMR spectra of each of the intermediate and final products in the synthesis of an o-BTN ionomer, including, in vertical order, o-BT (i.e., ortho, ortho'-bitoluene or 2,2'-dimethyl biphenyl), 7-bromo-1,1,1-trifluoro-2-heptanone, o-BTBr, and o-BTN.

FIG. 2 shows the $^1$H NMR spectra of each of the intermediate and final products in the synthesis of the o-BTN polymer, including o-BT (i.e., 2,2'-dimethyl biphenyl), 7-bromo-1,1,1-trifluoro-2-heptanone, o-BTBr, and o-BTN. NMR samples of the first three compounds were prepared in CDCl$_3$, and the NMR sample of o-BTN was prepared in DMSO-d$_6$. The integrals along the x-axis are taken from the spectrum of o-BTN that is positioned the closest to that axis, and are close to the expected values for that compound. The NMR spectra confirm the synthesis and purity of each synthesized compound, as shown by the peak assignments and integrals.

Synthesis of TEA-o-BTN Ionomer

A triethylamine-substituted analogue of o-BTN was synthesized according to substantially the same method as shown in Scheme 1, except that triethylamine was used in place of trimethylamine. For example, triethylamine (0.50 mL) was added to a solution of o-BTBr (0.50 g) in N,N-dimethylacetamide (1.0 mL) and stirred at 80° C. for 12 hours. The reaction was allowed to cool to room temperature, and the ionic polymer TEA-o-BTN was precipitated by adding ether. The precipitate was filtered and dried under vacuum (98% yield). $^1$H NMR (DMSO-d$_6$): δ (ppm) 7.32-6.97, 3.21, 3.05, 2.51, 1.96, 1.51, 1.28, 1.14.

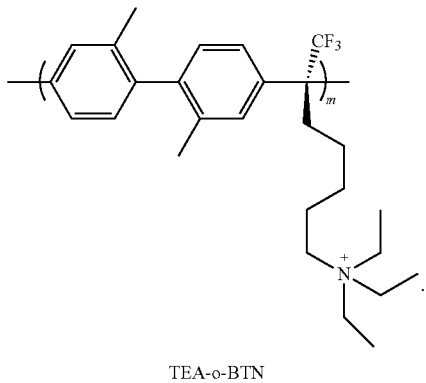

TEA-o-BTN

Synthesis of BPN Ionomer

An unsubstituted biphenyl ionomer bearing quaternary ammonium groups (BPN) was synthesized as in Scheme 1, except that 1-bromobenzene was used in place of 1-bromo-2-methylbenzene, and phenylboronic acid was used in place of 2-methylphenylboronic acid.

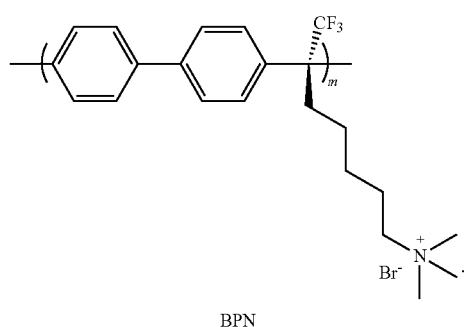

BPN

Ion Exchange Capacity and Solubility

The ion exchange capacity (IEC) of BPN, o-BTN, and TEA-o-BTN were calculated from $^1$H NMR spectra to be 2.6 meq g$^{-1}$, 2.5 meq g$^{-1}$, and 2.2 meq g$^{-1}$, respectively. This demonstrates that the IEC of the ionomer according to embodiments of the present disclosure is largely unaffected by 2,2'-dimethyl group substitution on the neutral unit, and only slightly decreased by substitution with ethyl groups at the quaternary ammonium.

The solubility properties of the hydroxide forms of BPN, o-BTN, and TEA-o-BTN in various solvents were compared, and are summarized in Table 2. In Table 2, "+" indicates that the ionomer is soluble at room temperature (about 25° C.); "−" indicates that the ionomer is insoluble; and "±" indicates that the ionomer is partially soluble/swollen. Also, in Table 2, MeOH refers to methanol, EtOH refers to ethanol, iPrOH refers to isopropyl alcohol, EtOH:iPrOH refers to a mixture of ethanol and isopropanol (in a 1:1 mixture by volume, as listed in Table 2), THF refers to tetrahydrofuran, and DMSO refers to dimethyl sulfoxide.

TABLE 2

|  | BPN | o-BTN | TEA-o-BTN |
|---|---|---|---|
| H$_2$O | − | − | − |
| MeOH | + | + | + |
| EtOH | + | + | + |
| iPrOH | ± | ± | ± |

TABLE 2-continued

|  | BPN | o-BTN | TEA-o-BTN |
|---|---|---|---|
| EtOH:iPrOH (1:1) | + | + | + |
| Ethylene glycol | + | + | + |
| THF | − | − | − |
| DMSO | ± | ± | ± |

The solubility data in Table 2 shows that the solubility of the ionomer according to embodiments of the present disclosure is largely unaffected by 2,2'-dimethyl group substitution and/or quaternary ammonium group substitution.

$H_2$ Diffusion Coefficient Measurements

The $H_2$ diffusion coefficients of the ionomers in solution were measured using pulsed field gradient proton NMR (PFG-$^1$H NMR) on a 500 MHz Bruker Advance. A 2 wt % ionomer dispersion in DMSO-$d_6$ was dried over anhydrous $MgSO_4$ to remove or decrease any water that would limit $H_2$ solubility in DMSO. The solution was syringe filtered into a dry glass vial and degassed by sonication for 5 min, after which ultra-high purity $H_2$ gas was directly bubbled into the solution for 30 min. The $H_2$-saturated solution was immediately injected into a standard glass NMR tube and hermetically sealed.

The parameters used in the pulse-field gradient $^1$H NMR experiments were selected according to the procedure described in Harmon, J. et al., "Determination of Molecular Self-Diffusion Coefficients Using Pulsed-Field-Gradient NMR: An Experiment for Undergraduate Physical Chemistry Laboratory", *Journal of Chemical Education* 2012, 89 (6), 780-783, the entire content of which is incorporated herein by reference. Briefly, the 90° pulse was recalibrated for each reported temperature, using a total inverse-recovery pulse sequence of: relaxation delay→π→τ→π/2→acquire, using variable delays of τ=0.1-50 seconds in increments of 0.1, 0.2, 0.5, 1, 2, 5, 10, 20, 30, 40, and 50 seconds. The logarithmic normalized peak area, S, of the $H_2$ peak at 4.5 ppm was plotted as a function of gradient pulse area, $q^2=y^2 g_z^2\delta^2$, where y is the magnetogyric ratio of hydrogen, g is the gradient pulse, and δ is the gradient pulse width. An exponential fit of the plot gave the $H_2$ diffusion coefficients through the Stejksal-Tanner equation: $S=S_o\,e^{-Dq2\Delta}$.

The measured $H_2$ diffusion coefficients at various temperatures for BPN and o-BTN are summarized in Table 3:

TABLE 3

| Temperature | Self-diffusion coefficient (D) of $H_2$ ($10^{-9}$ m$^2$ s$^{-1}$) | |
|---|---|---|
| (° C.) | BPN | o-BTN |
| 25 | 2.69 | 8.00 |
| 40 | 3.24 | 12.45 |
| 65 | 3.78 | 17.58 |
| 80 | 4.45 | 22.30 |

As shown in Table 3, the o-BTN ionomer exhibits an approximately 3-5-fold increase in $H_2$ diffusion coefficient over the BPN ionomer over the tested temperature range. As such, ionomers including methyl substituted polyaromatic backbones according to embodiments of the present disclosure appear to have enhanced $H_2$ permeation and transport, compared to un-substituted ionomers in the related art.

Microelectrode Analysis of Cationic Adsorption to the Catalyst

A microelectrode experiment to compare adsorption of the cationic group in the o-BTN and TEA-o-BTN ionomers to the catalyst was conducted using a modified setup of the micro-cell described in Yim, S. D., et al., "A Microelectrode Study of Interfacial Reactions at the Platinum-Alkaline Polymer Interface", *Journal of The Electrochemical Society*, 2015, 162 (6), F499-F506, the entire content of which is incorporated herein by reference. The micro-cell was equipped with a 5 mm glassy carbon disk as the working electrode, a graphite rod counter electrode, and a Hg/HgO reference electrode. An aqueous Pt/C catalyst ink containing 60 wt % Pt (Alfa Aesar) was deposited on top of the glassy carbon working electrode at a Pt loading of 46 μg/cm$^2$. 15 μL of a 1 wt % o-BTN or TEA-o-BTN ionomer (hydroxide form, dispersed in dimethylacetamide) was pipetted on top of the catalyst layer and dried in air to form a thin film having an average thickness of about 0.5 μm. A quaternary ammonium tethered poly(phenylene) anion exchange membrane (AEM) was used to bridge the working electrode, the counter electrode, and the reference electrode, the latter two of which were located a few centimeters underneath the working electrode in 0.1 M NaOH. Additional ionomer was deposited on the side wall of the glassy carbon disk to ensure good ion conductivity and adhesion between the AEM and working electrode. $N_2$ or $H_2$ gas were bubbled through the NaOH solution. The hydrogen oxidation polarization curves reported herein were measured in $H_2$-saturated solution, background corrected by subtracting the current in $N_2$-saturated solution, and further corrected for iR drop.

Figure 3:
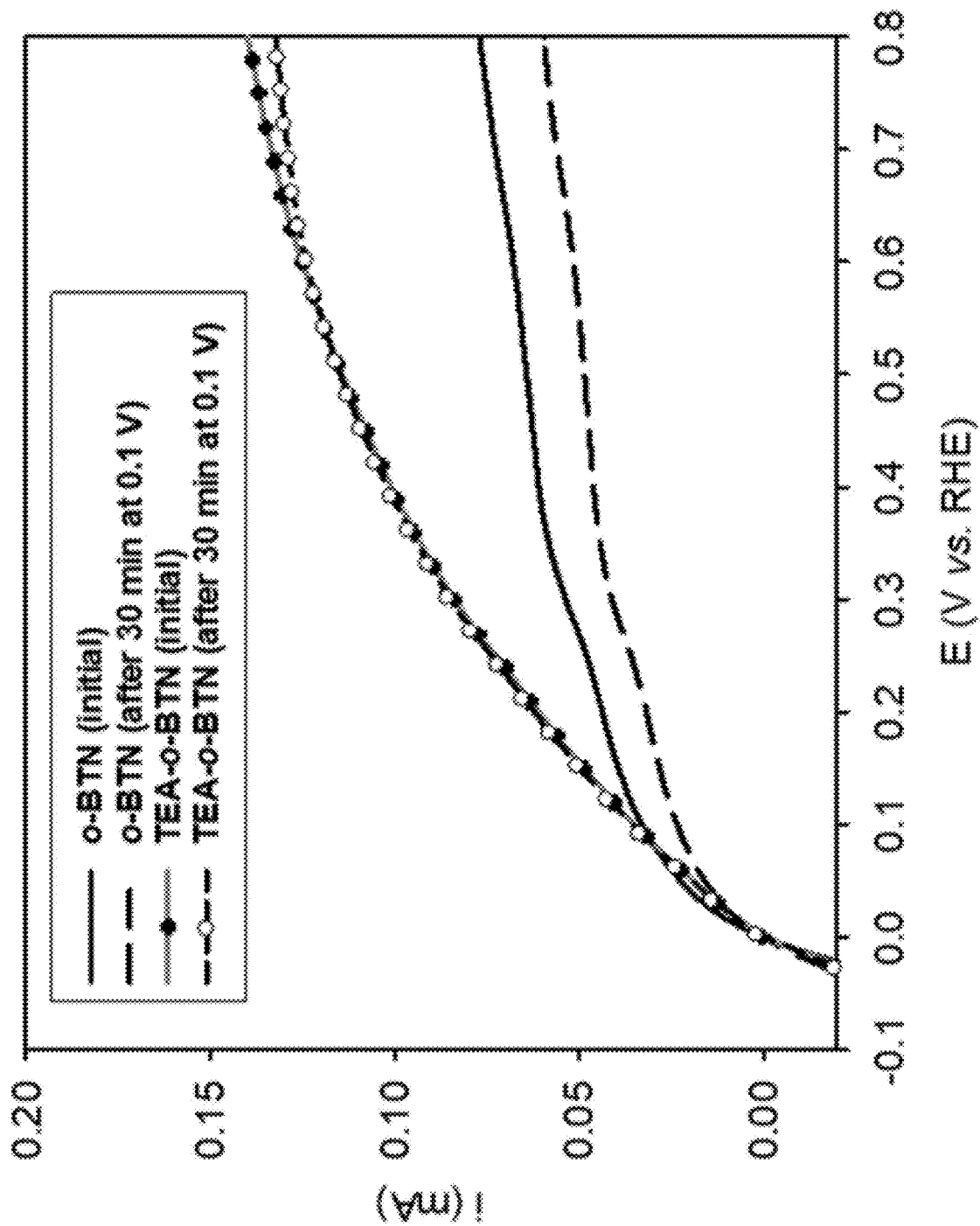
FIG. 3 is a combined voltammogram of microelectrodes modified with thin films of Pt/C and o-BTN ionomer (solid and dashed lines) or TEA-o-BTN ionomer (circle markers) under saturated $H_2$ conditions between 0.0 to 0.8 V vs. RHE after initial pretreatment of the microelectrode at 1.0 V vs. RHE for 20 seconds ("initial"; solid lines and filled circles) and prolonged exposure of the microelectrode at 0.1 V vs. RHE for 30 min ("after 30 min at 0.1 V"; dashed lines and empty circles).

FIG. 3 is a combined voltammogram of microelectrodes modified with thin films of Pt/C and o-BTN ionomer (solid and dashed lines) or TEA-o-BTN ionomer (circle markers) under saturated $H_2$ conditions between 0.0 V to 0.8 V vs. RHE after initial pretreatment of the microelectrode at 1.0 V vs. RHE for 20 seconds ("initial"; solid lines and filled circles) and after prolonged exposure of the microelectrode at 0.1 V vs. RHE for 30 min ("after 30 min at 0.1 V"; dashed lines and empty circles). The intrinsic $H_2$ oxidation (HOR) activity of the Pt/C microelectrode in contact with o-BTN or TEA-o-BTN was determined from the slope of each voltammogram between 0 and 0.01 mA. It was found that the intrinsic activities of the Pt/C microelectrode in contact with o-BTN or TEA-o-BTN were similar, regardless of the particular ionomer and pretreatment conditions.

When the microelectrodes were pre-conditioned at 1.4 V vs. RHE for 30 seconds, it was found that the current density at the TEA-o-BTN coated Pt/C microelectrode was significantly higher than that at the o-BTN coated Pt/C microelectrode at >0.05 V, suggesting that co-adsorption on the Pt/C microelectrode is much less for TEA than TMA (e.g., the thickness of an adsorbed quaternary ammonium cation-hydroxide-water layer is decreased for TEA relative to TMA). Further, the limiting current density of the TEA-o-BTN-coated Pt/C microelectrode at 0.8 V vs. RHE was found to be about 1.8 times higher than that of the o-BTN-coated Pt/C microelectrode.

When the microelectrodes were held at 0.1 V vs. RHE for 30 min, the limiting current of all ionomer coated microelectrodes decreased due to cumulative co-adsorption of a quaternary ammonium cation-hydroxide-water layer to the catalyst surface. Under these conditions, the hydrogen diffusion rate (as assume to be proportional to limiting current) in the o-BTN thin film was about 2.2 times smaller than that in the TEA-o-BTN thin film. Further, a larger decrease in current density was observed for the o-BTN thin film, again suggesting that co-adsorption of a quaternary ammonium cation-hydroxide-water layer may be decreased by the use of larger substituents, such as triethylamine, at the quaternary ammonium group.

Fuel Cell Performance and Durability
Membrane Electrode Assembly (MEA) Fabrication MEAs including each of the ionomers were prepared according to the following procedure. A 5 wt % ionomer solution was prepared by dissolving the hydroxide forms of BPN, o-BTN and TEA-o-BTN (for example, as prepared using hydroxide ion exchange on the bromide forms synthesized above) in 50:50 wt % isopropanol-ethanol.

Catalyst inks were prepared by dispersing a catalyst and the above 5 wt % ionomer solution in a mixture of 80:20 wt % isopropanol and water. Here, the catalyst was Pt/C (60 wt % Pt on high surface area carbon, HISPEC 9100, JM catalysts) or Pt—Ru/C (50 wt % Pt-25 wt % Ru on high surface area carbon, HISPEC 12100, JM catalysts). The resulting catalyst inks were painted on a gas diffusion layer (BC-29, SGL carbon) followed by drying under vacuum at 60° C. for 1 h to thereby form each electrode. The platinum loadings were 0.5 mg cm$^{-2}$ in Pt—Ru/C or 0.6 mg cm$^{-2}$ in Pt/C for each anode and cathode, respectively. The ionomer to catalyst ratio was set at 17 wt % for all electrodes. The catalyst ink films were deposited on the electrodes to have an average thickness of about 45 μm.

Prior to membrane electrode assembly, the electrodes were immersed in 1 M NaOH solution to ensure conversion of all ionomers to hydroxide form, and to remove any carbonation that may have occurred during electrode preparation. The revitalized cathode and anode were then sandwiched around a quaternized poly(m-terphenylene) (TPN) hydroxide anion exchange membrane (AEM) (35 μm thickness, m1=10-500) to form a MEA. Each MEA was then placed in fuel cell hardware (active area 5 cm$^2$, fuel cell technologies) to provide a testable fuel cell.

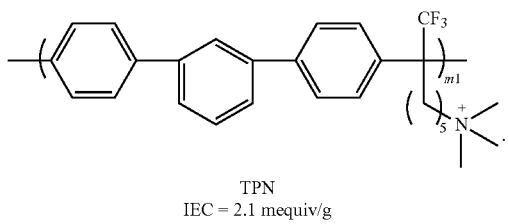

TPN
IEC = 2.1 mequiv/g

Example 1: Fuel Cell with Pt/C in o-BTN

A MEA and a fuel cell were assembled by stacking a cathode, an AEM, and an anode as described above. Pt/C was loaded as the catalyst and o-BTN was used as the ionomer to form both electrodes.

Example 2: Fuel Cell with Pt—Ru/C in o-BTN

A MEA and a fuel cell were assembled by stacking a cathode, an AEM, and an anode as described above. Pt—Ru/C was loaded as the catalyst and o-BTN was used as the ionomer to form both electrodes.

Example 3: Fuel Cell with Pt—Ru/C in TEA-o-BTN

A MEA and a fuel cell were assembled by stacking a cathode, an AEM, and an anode as described above. Pt—Ru/C was loaded as the catalyst and TEA-o-BTN was used as the ionomer to form both electrodes.

Comparative Example 1: Fuel Cell with Pt/C in BPN

A MEA and a fuel cell were assembled by stacking a cathode, an AEM, and an anode as described above. Pt/C was loaded as the catalyst and BPN was used as the ionomer to form both electrodes.

Comparative Example 2: Fuel Cell with Pt—Ru/C in BPN

A MEA and a fuel cell were assembled by stacking a cathode, an AEM, and an anode as described above. Pt—Ru/C was loaded as the catalyst and BPN was used as the ionomer to form both electrodes.

Figure 4:
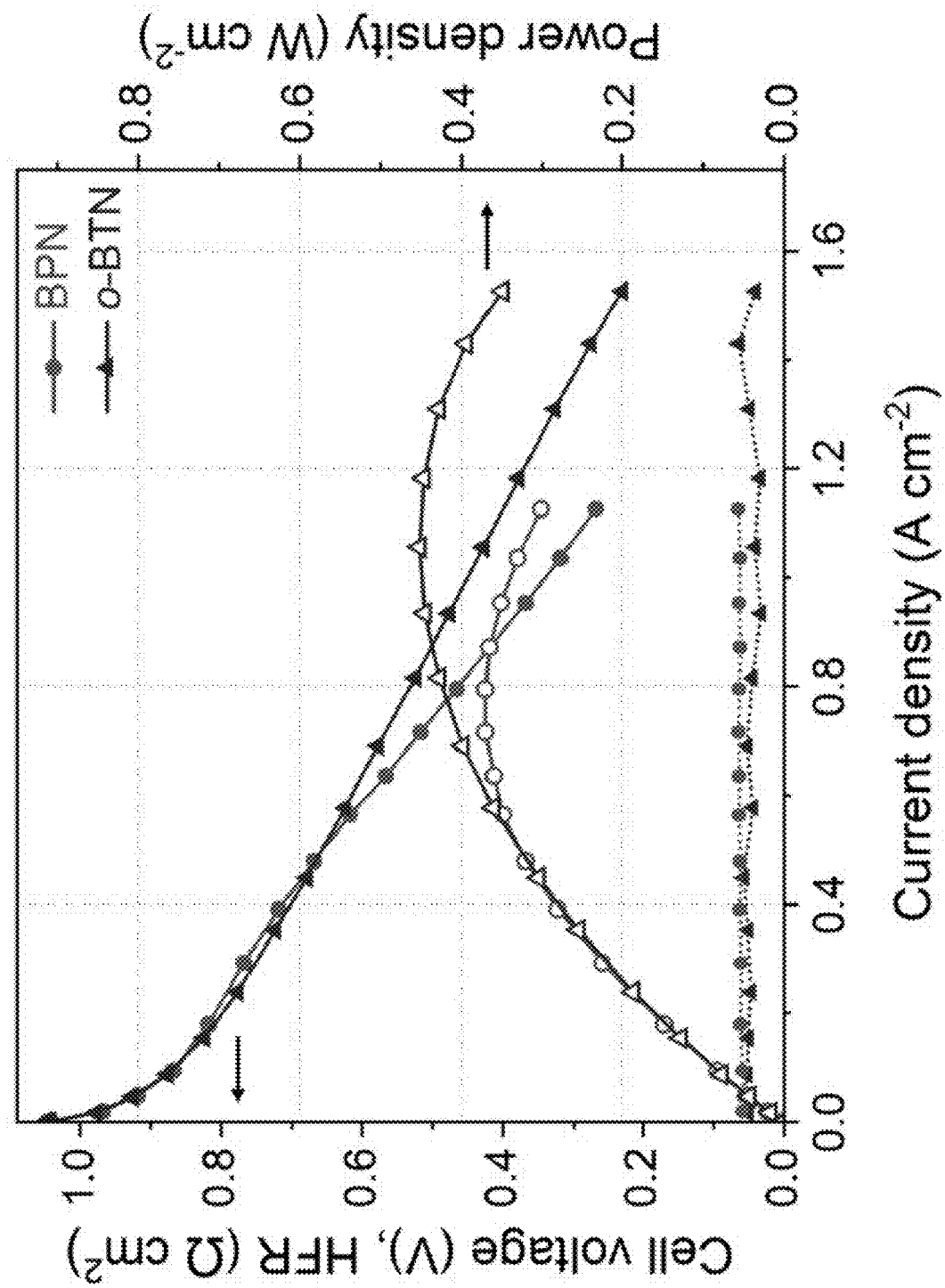
FIG. 4 is a combined plot showing the I-V polarization curves (solid lines and markers, left axis), power density curves (solid lines and empty markers, right axis), and high frequency resistance (HFR) curves (dashed lines and solid markers, left axis) for the fuel cells of Example 1 (o-BTN, Pt/C, triangle markers) and Comparative Example 1 (BPN, Pt/C, circle markers) at a temperature of 80° C. and a total pressure of 285 kPa.

The performances of the fuel cells according to Examples 1 and 2 and Comparative Examples 1 and 2 were evaluated and compared. FIG. 4 is a combined plot showing the I-V polarization curves (solid lines and markers, left axis), power density curves (solid lines and empty markers, right axis), and high frequency resistance (HFR) curves (dashed lines and solid markers, left axis) for the fuel cells of Example 1 (o-BTN, Pt/C, triangle markers) and Comparative Example 1 (BPN, Pt/C, circle markers) at a temperature of 80° C. and a total pressure of 285 kPa. The polarization curves, power density curves, and HFR curves were recorded simultaneously (e.g., under the same conditions) in each fuel cell, under a gas flow rate of 500/300 sccm $H_2/O_2$. Voltages are in V. vs. RHE. The polarization curves show that the fuel cell with o-BTN is able to maintain a higher cell voltage with increasing current densities in the ohmic polarization region, compared to the fuel cell with BPN. The calculated power density curves for the fuel cells show that the fuel cell with Pt/C in o-BTN attained an approximately 25% higher peak power density compared to the fuel cell with Pt/C in BPN. As the performance difference appears at a minimum current density of about 0.5 A cm$^{-2}$, the intrinsic kinetic performances of the MEAs appear to be substantially similar, suggesting that the improved efficiencies of the o-BTN fuel cells (Examples 1 and 2) are due to improved $H_2$ transport. The HFR curves, which show the total membrane resistance including the electronic resistance, membrane-electrode interfacial resistance, and areal specific resistance of the AEMs, are low for both fuel cells, indicating that the substituted aromatic groups in o-BTN do not increase the resistance of the cell, compared to BPN.

Figure 5:
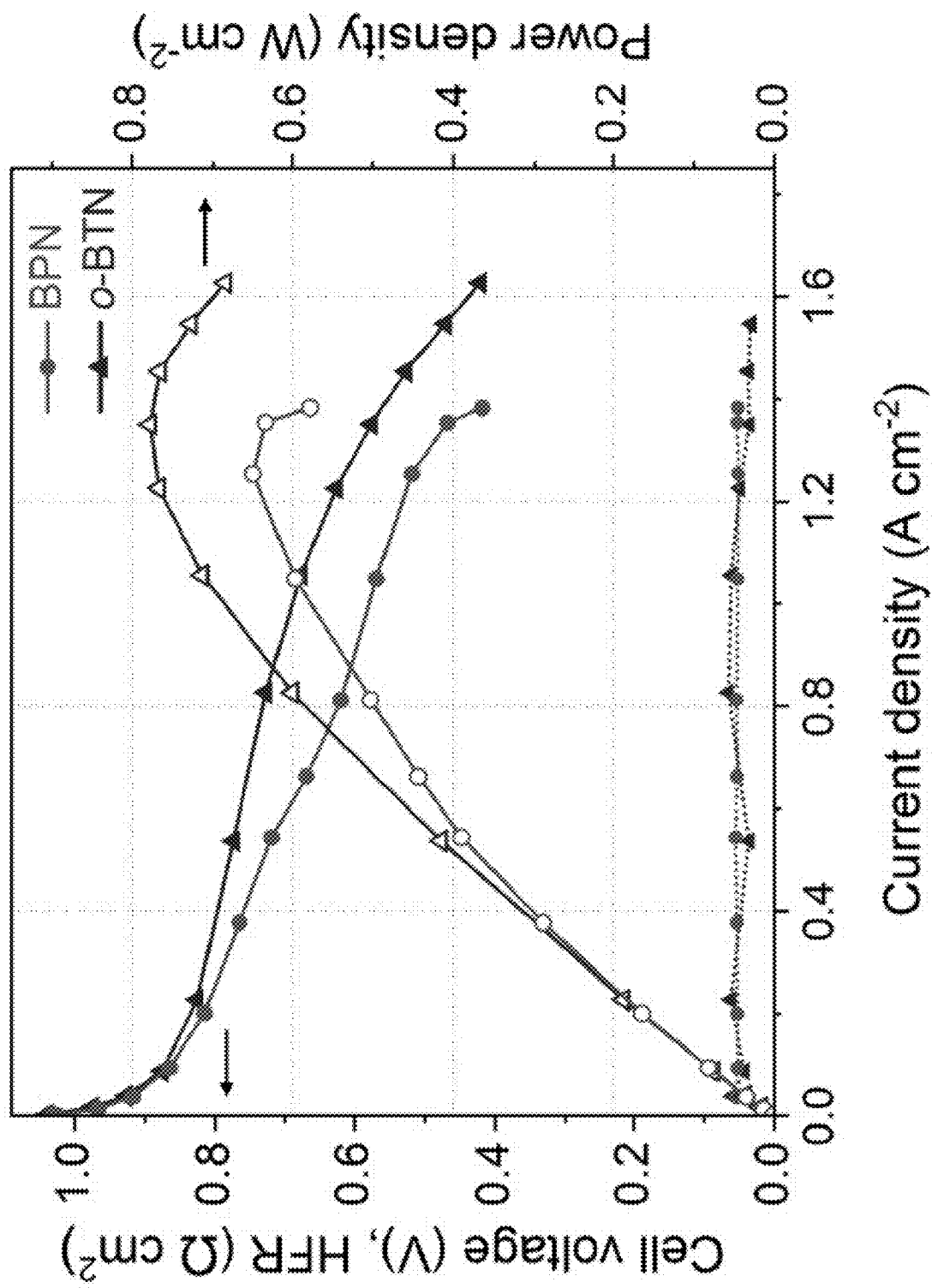
FIG. 5 is a combined plot showing the I-V polarization curves (solid lines and markers, left axis), power density curves (solid lines and empty markers, right axis), and HFR curves (dashed lines and solid markers, left axis) for the fuel cells of Example 2 (o-BTN, Pt—Ru/C, triangle markers) and Comparative Example 2 (BPN, Pt—Ru/C, circle markers) at a temperature of 80° C. and a total pressure of 285 kPa.

FIG. 5 is a combined plot showing the I-V polarization curves (solid lines and markers, left axis), power density curves (solid lines and empty markers, right axis), and HFR curves (dashed lines and solid markers, left axis) for the fuel cells of Example 2 (o-BTN, Pt—Ru/C, triangle markers) and Comparative Example 2 (BPN, Pt—Ru/C, circle markers) at a temperature of 80° C. and a total pressure of 285 kPa. The polarization curves, power density curves, and HFR curves were recorded simultaneously (e.g., under the same conditions) in each fuel cell, and the gas flow rates were the same as in the tests of FIG. 3. Voltages are in V. vs. RHE. The polarization curves show that the fuel cell with o-BTN is able to maintain a higher cell voltage with increasing current densities in the ohmic polarization region, compared to the fuel cell with BPN. The calculated power density curves for the fuel cells show that the fuel cell with Pt—Ru/C in o-BTN attained an approximately 25% higher peak power density compared to the fuel cell with Pt—Ru/C in BPN. The performance of Example 2 (o-BTN) became superior to that of Comparative Example 2 (BPN) at a current density of about 0.3 A cm$^{-2}$, again suggesting that the performance of the BPN is limited by reactant (e.g., $H_2$) diffusion, and the improved efficiencies of the o-BTN fuel cells (Examples 1 and 2) are due to improved $H_2$ transport, relative to the BPN fuel cell (Comparative Examples 1 and 2). The HFR curves show that the total membrane resistance is low for both fuel cells and that the substituted aromatic groups in o-BTN do not increase the resistance of the cell, compared to BPN.

Figure 6:
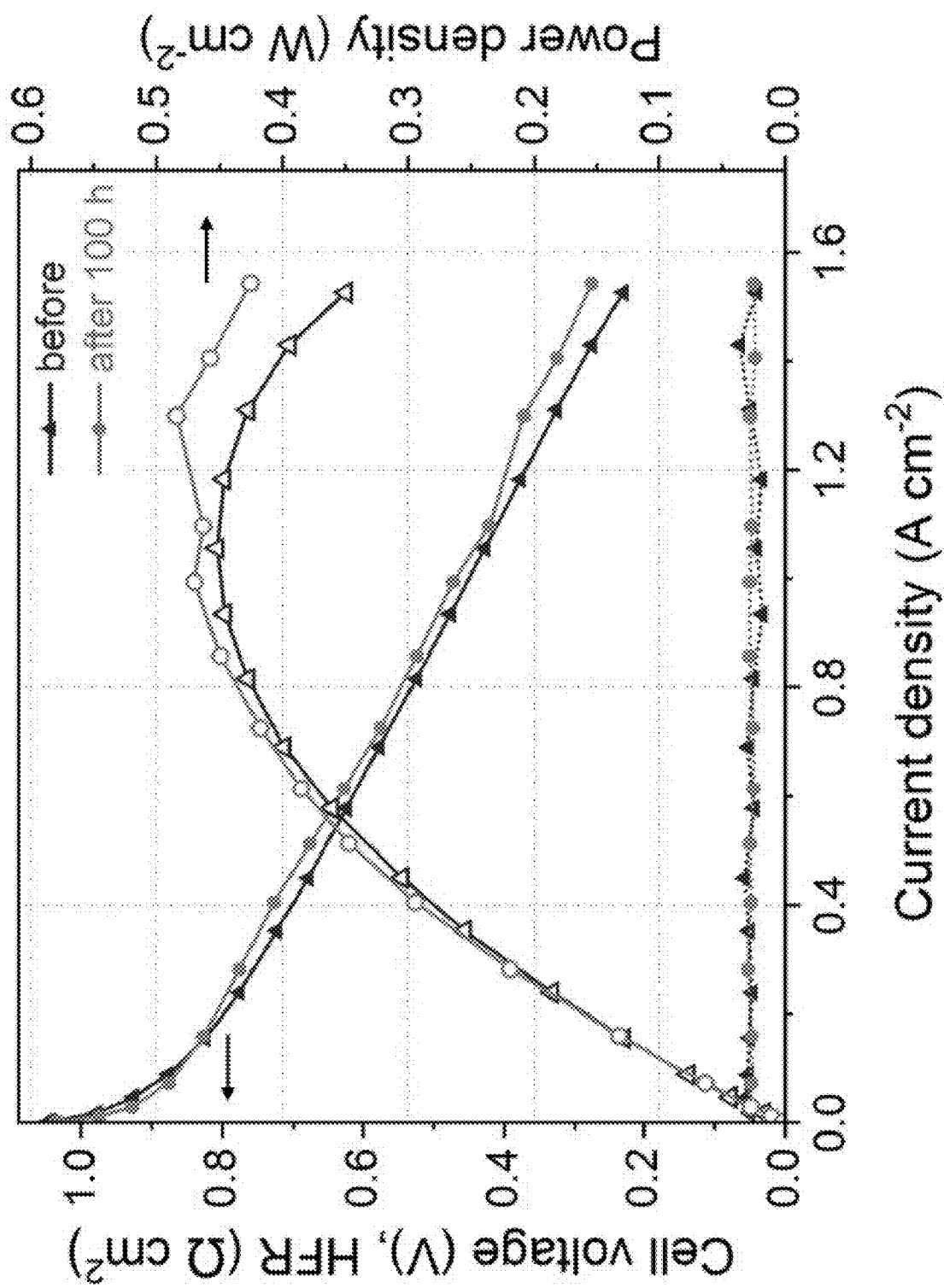
FIG. 6 is a combined plot showing the I-V polarization curves (solid lines and markers, left axis), power density curves (solid lines and empty markers, right axis), and HFR curves (dashed lines and solid markers, left axis) for the fuel cell of Example 1 (o-BTN, Pt/C) at a temperature of 80° C. and a total pressure of 146 kPa, before (triangle markers) and after 100 hrs. of run time (circle markers).

The durability of the fuel cells according to Examples 1 and 2 were evaluated. FIG. 6 is a combined plot showing the I-V polarization curves (solid lines and solid circles, left axis), power density curves (solid lines and empty circles, right axis), and HFR curves (dashed lines and solid circles, left axis) for the fuel cell of Example 1 (o-BTN, Pt/C) at a temperature of 80° C. and a total pressure of 146 kPa, before (triangle markers) and after 100 hrs. of run time (circle markers). The polarization curves, power density curves, and HFR curves were recorded simultaneously (e.g., under the same conditions) in the fuel cell, and the gas flow rates were the same as in the tests of FIG. 3. Voltages are in V. vs. RHE. The minimal changes between the two polarization curves, the two power density curves, and the two HFR curves show that the fuel cell with Pt/C in o-BTN at the anode is stable over an extended operating period.

Figure 7:
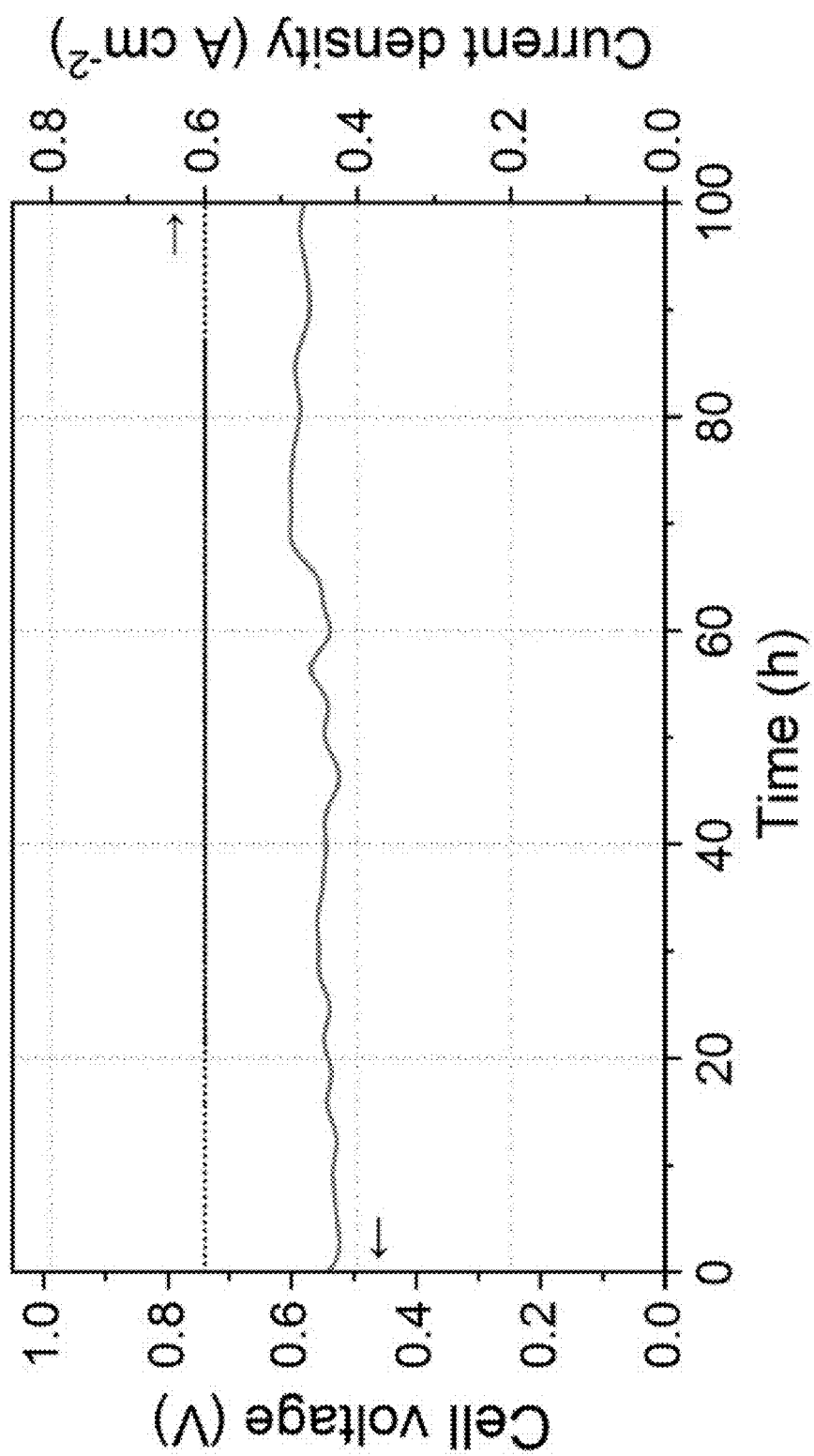
FIG. 7 is a plot showing the change in cell voltage (solid lower trace, left axis) over a runtime of 100 hrs. and at a constant current density of 0.6 A $cm^{-2}$ (dotted upper trace, right axis) for the fuel cell according to Example 2 (o-BTN, Pt—Ru/C) at a temperature of 80° C. and a total pressure of 146 kPa.

FIG. 7 is a plot showing the change in cell voltage vs. RHE (solid lower trace, left axis) over a runtime of 100 hrs. at a constant current density of 0.6 A $cm^{-2}$ (dotted upper trace, right axis) for the fuel cell according to Example 2 (o-BTN, Pt—Ru/C) at a temperature of 80° C. and a total pressure of 146 kPa. The minimal change in voltage over the runtime of the experiment again suggests that the fuel cell with Pt—Ru/C in o-BTN at the anode is stable over an extended operating period.

Figure 8:
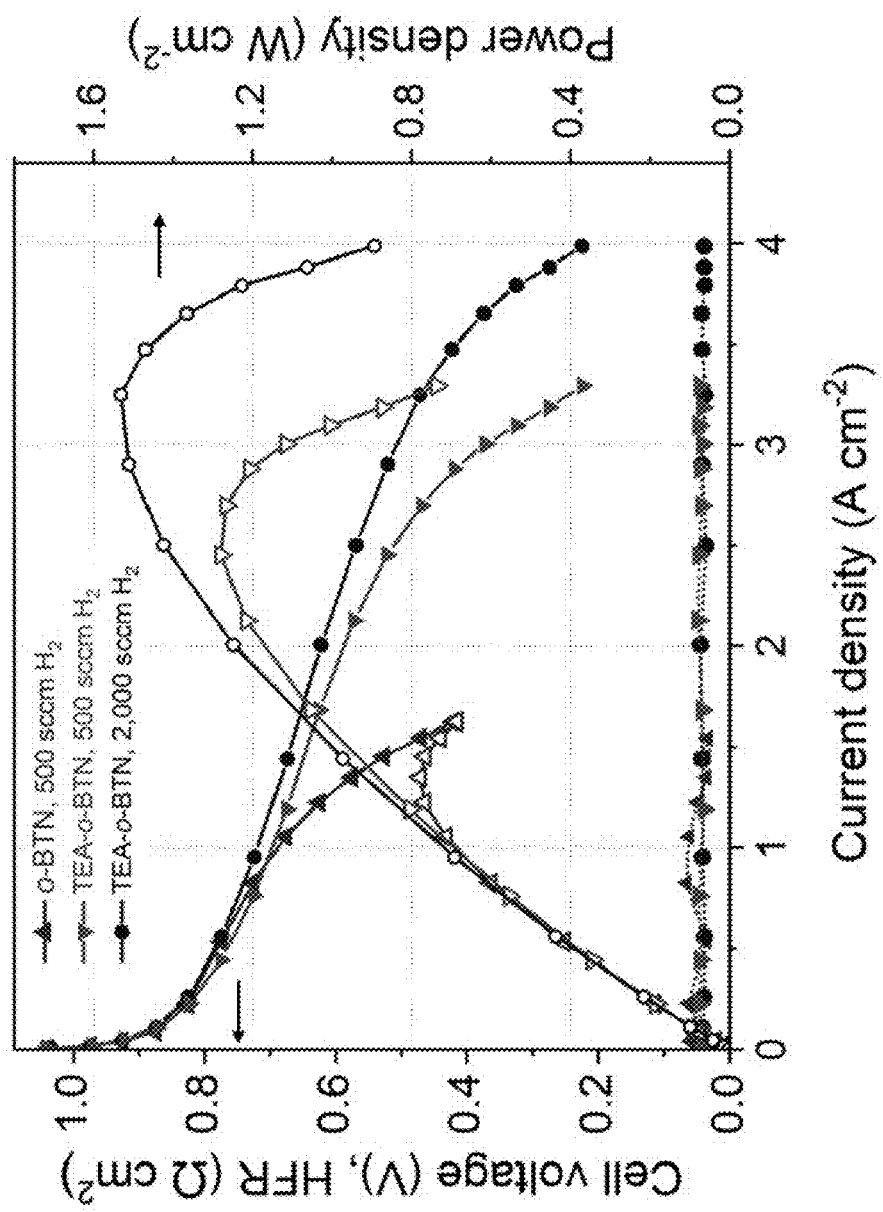
FIG. 8 is a combined plot showing the I-V polarization curves (solid lines and markers, left axis), power density curves (solid lines and empty markers, right axis), and HFR curves (dashed lines and solid markers, left axis) for the fuel cells of Example 2 (o-BTN, Pt—Ru/C, triangle markers) and Example 3 (TEA-o-BPN, Pt—Ru/C, inverted triangle markers) at a temperature of 80° C., a total pressure of 285 kPa, and 500 sccm $H_2$/300 sccm $O_2$, as well as Example 3 (circle markers) under an increased flow of 2,000 sccm $H_2$/500 sccm $O_2$.

FIG. 8 is a combined plot showing the I-V polarization curves (solid lines and markers, left axis), power density curves (solid lines and empty markers, right axis), and HFR curves (dashed lines and solid markers, left axis) for the fuel cells of Example 2 (o-BTN, Pt—Ru/C, triangle markers) and Example 3 (TEA-o-BPN, Pt—Ru/C, inverted triangle markers) at a temperature of 80° C., a total pressure of 285 kPa, and 500 sccm $H_2$/300 sccm $O_2$, as well as Example 3 (circle markers) under an increased flow of 2,000 sccm $H_2$/500 sccm $O_2$. The polarization curves, power density curves, and HFR curves were recorded simultaneously (e.g., under the same conditions) in each fuel cell. Voltages are in V. vs. RHE. The polarization curves show that the fuel cell with TEA-o-BTN is able to maintain a higher cell voltage with increasing current densities in the ohmic polarization region, compared to the fuel cell with BPN. The calculated power density curves for the fuel cells show that the fuel cell with Pt—Ru/C in o-BTN attained a higher peak power density compared to the fuel cell with Pt—Ru/C in BPN. The HFR curves show that the total membrane resistance is low for both fuel cells and that the substituted aromatic groups in o-BTN do not increase the resistance of the cell.

Accordingly, the polyaromatic electrolyte according to embodiments of the present disclosure were found to be have favorable polarization and power characteristics in comparison to conventional polymeric electrolyte materials, and were found to be sufficiently stable.

While certain exemplary embodiments of the present disclosure have been illustrated and described, those of ordinary skill in the art will recognize that various changes and modifications can be made to the described embodiments without departing from the spirit and scope of the present invention, and equivalents thereof, as defined in the claims that follow this description. For example, although certain components may have been described in the singular, i.e., "an" electrode, "a" catalyst, and the like, one or more of these components in any combination can be used according to the present disclosure.

Also, although certain embodiments have been described as "comprising" or "including" the specified components, embodiments "consisting essentially of" or "consisting of" the listed components are also within the scope of this disclosure. For example, while embodiments of the present invention are described as comprising a polymeric electrolyte and a catalyst, embodiments consisting essentially of or consisting of these items are also within the scope of this disclosure. Accordingly, a fuel cell anode may consist of a polymeric electrolyte and a catalyst, or may consist essentially of a polymeric electrolyte and a catalyst. In this context, "consisting essentially of" means that any additional components will not materially affect the performance of the fuel cell anode.

As used herein, unless otherwise expressly specified, all numbers such as those expressing values, ranges, amounts or percentages may be read as if prefaced by the word "about," even if the term does not expressly appear. Further, the word "about" is used as a term of approximation, and not as a term of degree, and reflects the penumbra of variation associated with measurement, significant figures, and interchangeability, all as understood by a person having ordinary skill in the art to which this disclosure pertains. Any numerical range recited herein is intended to include all sub-ranges subsumed therein. Plural encompasses singular and vice versa. For example, while the present disclosure may describe "an" electrode or "a" catalyst, a mixture of such electrodes or catalysts can be used. When ranges are given, any endpoints of those ranges and/or numbers within those ranges can be combined within the scope of the present disclosure. The terms "including" and like terms mean "including but not limited to," unless specified to the contrary.

Notwithstanding that the numerical ranges and parameters set forth herein may be approximations, numerical values set forth in the Examples are reported as precisely as is practical. Any numerical value, however, inherently contains certain errors necessarily resulting from the standard variation found in their respective testing measurements. The word "comprising" and variations thereof as used in this description and in the claims do not limit the disclosure to exclude any variants or additions.

What is claimed is:

1. A polyaromatic electrolyte, the polyaromatic electrolyte having a structure represented by:

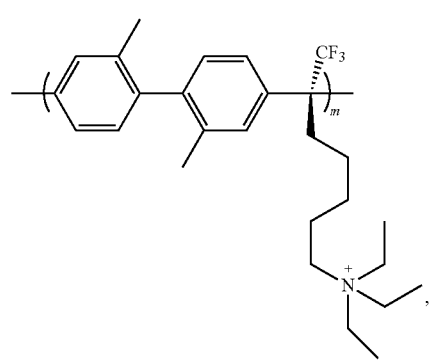

TEA-o-BTN wherein m is an integer of 10 to 500.

2. The polyaromatic electrolyte of claim 1, wherein the polyaromatic electrolyte has a number average molecular mass ($M_n$) of about 6,330.

\* \* \* \* \*